(12) United States Patent
Lee

(10) Patent No.: US 7,492,428 B2
(45) Date of Patent: Feb. 17, 2009

(54) THIN FILM TRANSISTOR ARRAY SUBSTRATE AND FABRICATING METHOD THEREOF

(75) Inventor: Seung Chul Lee, Kyounggi-do (KR)

(73) Assignee: LG Display Co., Ltd., Seoul (KR)

( * ) Notice: Subject to any disclaimer, the term of this patent is extended or adjusted under 35 U.S.C. 154(b) by 415 days.

(21) Appl. No.: 10/964,929

(22) Filed: Oct. 15, 2004

(65) Prior Publication Data

US 2005/0128410 A1    Jun. 16, 2005

(51) Int. Cl.
G02F 1/1368    (2006.01)
G02F 1/1343    (2006.01)
G02F 1/139    (2006.01)

(52) U.S. Cl. .......................... 349/141; 349/42; 349/187
(58) Field of Classification Search .................... 349/42, 349/141, 143, 145, 146, 187, 43, 147; 345/92; 257/59, 72; 438/30
See application file for complete search history.

(56) References Cited

U.S. PATENT DOCUMENTS

| | | | |
|---|---|---|---|
| 5,905,556 A * | 5/1999 | Suzuki et al. ................ | 349/141 |
| 6,088,078 A * | 7/2000 | Kim et al. .................... | 349/141 |
| 6,128,061 A | 10/2000 | Lee et al. | |
| 6,256,081 B1 | 7/2001 | Lee et al. | |
| 6,266,118 B1 | 7/2001 | Lee et al. | |
| 6,469,764 B1 | 10/2002 | Kim et al. | |
| 6,512,565 B1 * | 1/2003 | Lee et al. .................... | 349/130 |
| 6,618,109 B2 | 9/2003 | Hidehira et al. | |
| 6,624,866 B2 | 9/2003 | Matsumoto | |
| 6,859,248 B2 | 2/2005 | Matsumoto et al. | |
| 2002/0018168 A1 | 2/2002 | Hiroshi | |
| 2002/0047959 A1 | 4/2002 | Masumoto et al. | |
| 2004/0056987 A1 * | 3/2004 | Song ........................... | 349/43 |

FOREIGN PATENT DOCUMENTS

| | | |
|---|---|---|
| CN | 1503373 A | 6/2004 |
| JP | 09-00593 | 1/1997 |
| JP | 09-258269 | 10/1997 |
| JP | 11-125835 | 5/1999 |
| JP | 11-242233 | 9/1999 |
| JP | 11-326955 | 11/1999 |
| JP | 11-352483 | 12/1999 |
| JP | 2000-098405 | 4/2000 |
| JP | 2000-101110 | 4/2000 |
| JP | 2000-122082 | 4/2000 |
| JP | 2000-131717 | 5/2000 |
| JP | 2001-330842 | 11/2001 |
| JP | 2002-023179 | 1/2002 |
| JP | 2002-040456 | 2/2002 |
| JP | 2002-131740 | 5/2002 |
| JP | 2003-015146 | 1/2003 |
| KR | 100257976 | 3/2000 |
| KR | 100265572 | 6/2000 |

* cited by examiner

Primary Examiner—Dung Nguyen
Assistant Examiner—Tai Duong
(74) Attorney, Agent, or Firm—McKenna Long & Aldridge LLP

(57) ABSTRACT

A thin film transistor array substrate includes: a gate line and a data line on a substrate to define a pixel area; a thin film transistor in the pixel area; a pixel electrode connected to the thin film transistor; and a common electrode positioned to oppose the pixel electrode and forming a closed aperture area for transmitting and shutting off light by a rotation of liquid crystal positioned within said aperture area.

26 Claims, 28 Drawing Sheets

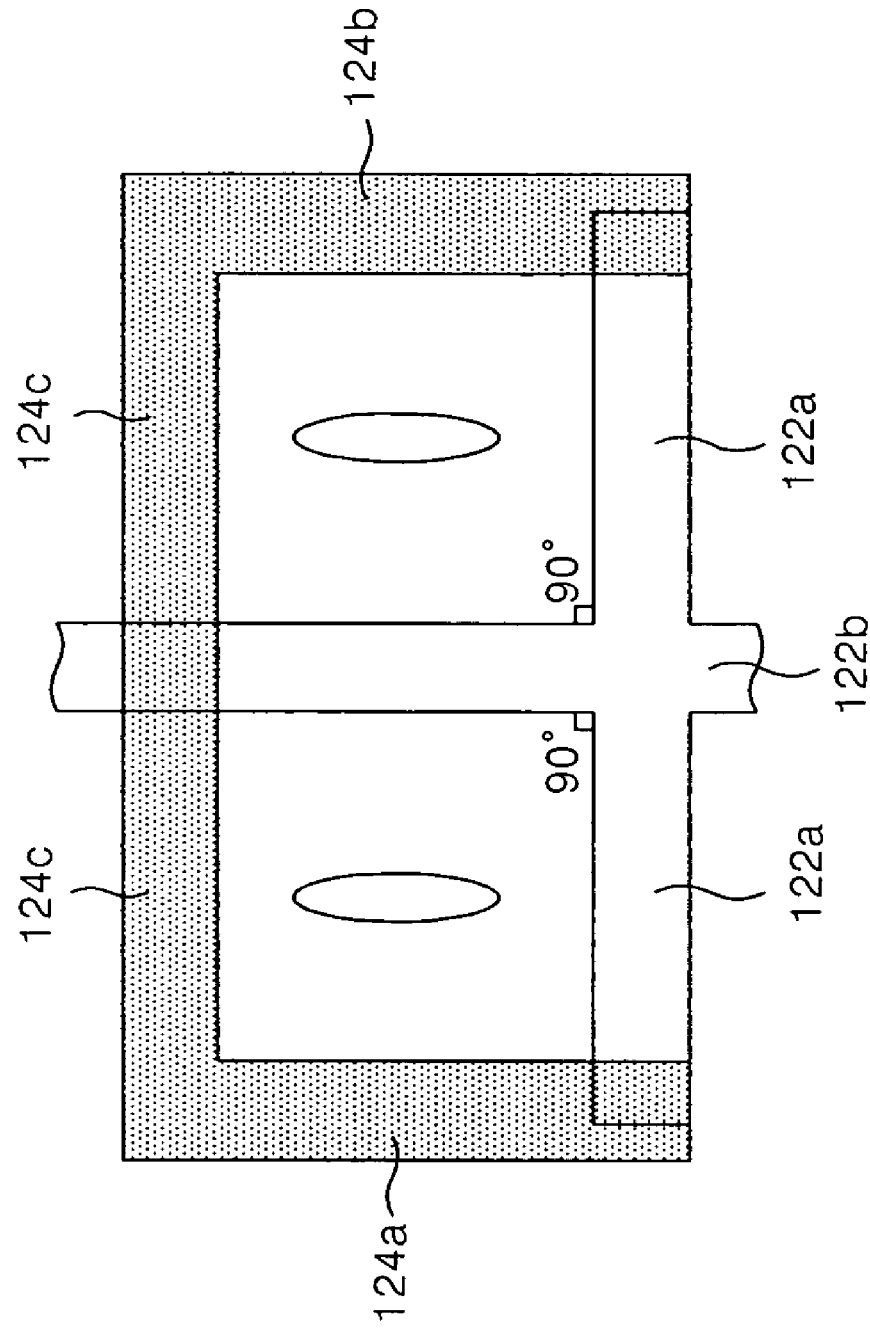

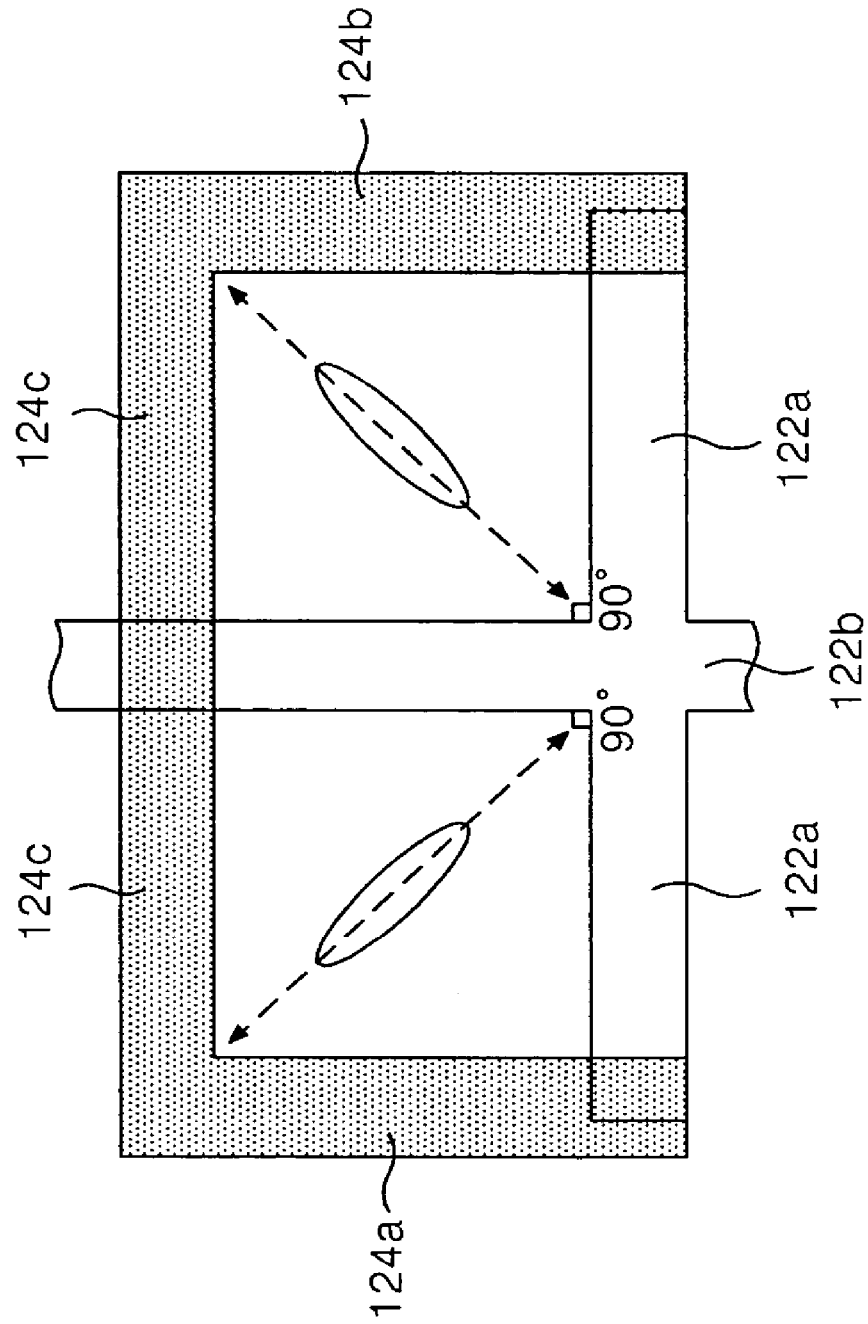

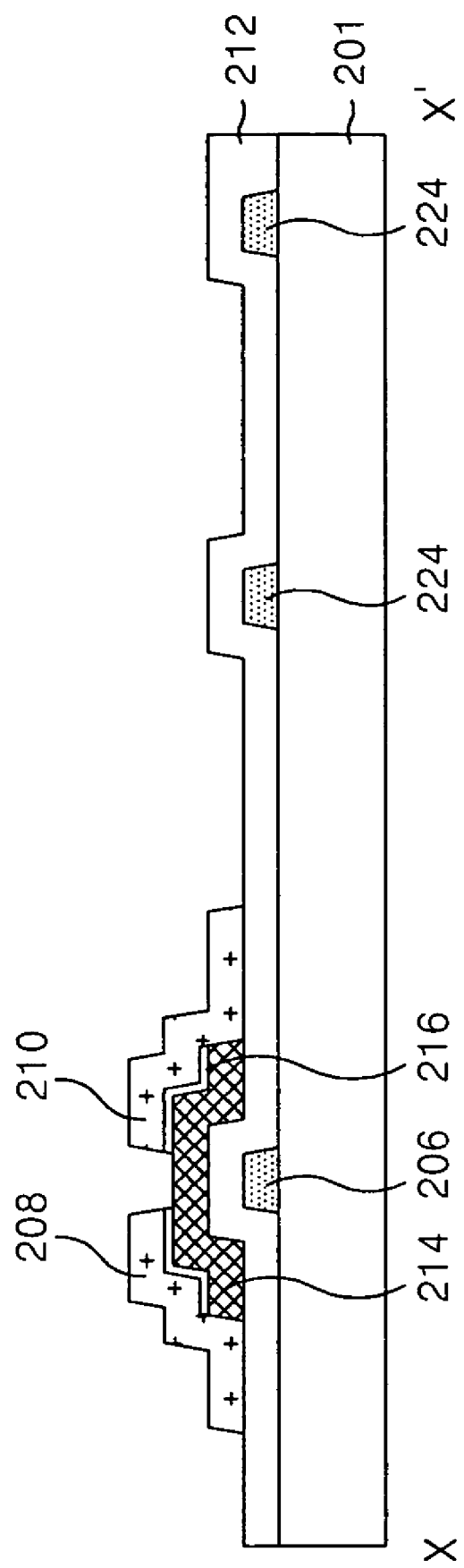

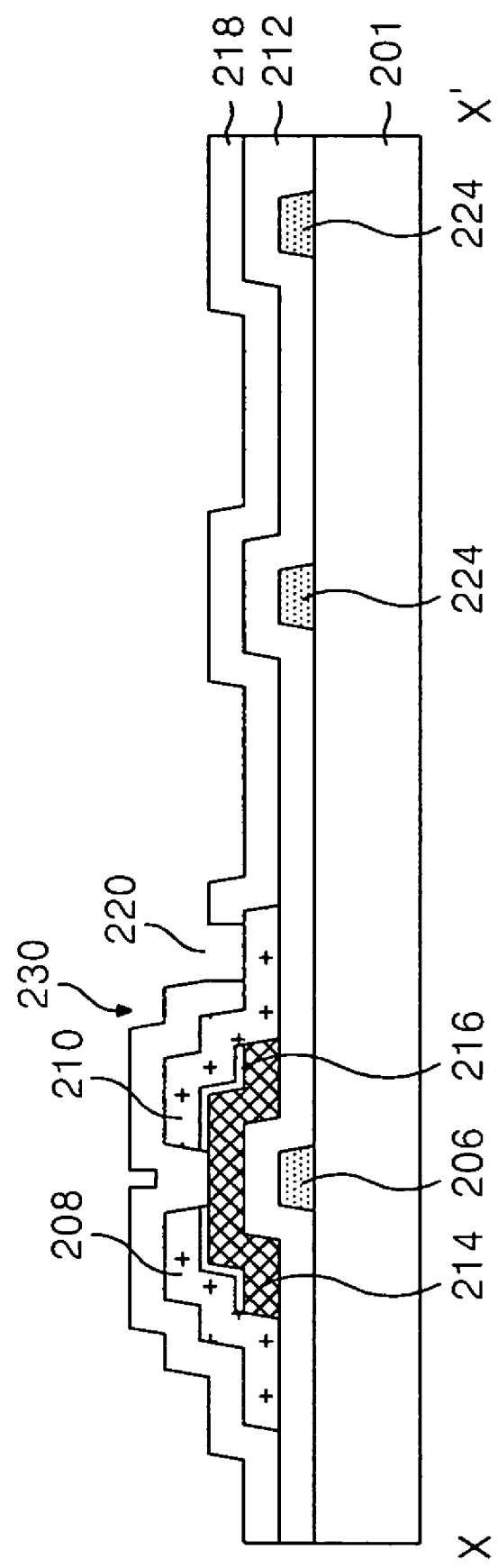

THIN FILM TRANSISTOR ARRAY SUBSTRATE AND FABRICATING METHOD THEREOF

This application claims the benefit of Korea Patent Application No. 2003-90299 filed on Dec. 11, 2003, which is hereby incorporated by reference.

BACKGROUND OF THE INVENTION

1. Field of the Invention

The present invention relates to a liquid crystal display, and more particularly to a thin film transistor array substrate and a fabricating method thereof.

2. Description of the Related Art

Generally, a liquid crystal display (LCD) controls light transmittance of liquid crystal using an electric field, to thereby display an image. Liquid crystal displays are largely classified into two types: a vertical electric field type and a horizontal electric field type. This classification is based upon the direction that the electric field drives the liquid crystal.

The liquid crystal display of vertical electric field type drives a liquid crystal in a twisted nematic (TN) mode with a vertical electric field formed between a pixel electrode and a common electrode arranged in opposition to each other on the upper and lower substrates. The liquid crystal display of vertical electric field applying type has an advantage of a high aperture ratio while having a drawback of a narrow viewing angle about 90 degrees. The liquid crystal display of horizontal electric field type drives a liquid crystal in an in plane switch (IPS) mode with a horizontal electric field between the pixel electrode and the common electrode arranged in parallel to each other on the lower substrate. The liquid crystal display of horizontal electric field type has an advantage of a wide viewing angle at about 160 degrees. Hereinafter, the liquid crystal display of horizontal electric field applying type will now be described in detail.

FIG. 1 is a plan view showing a structure of a thin film transistor array substrate of the related art horizontal electric field type LCD, and FIG. 2 is a cross-sectional view of the thin film transistor array substrate taken along the line II-II' in FIG. 1. Referring to FIG. 1 and FIG. 2, the thin film transistor array substrate includes gate lines 2 and data lines 4 provided on a lower substrate 1 to cross each other. A thin film transistor 30 is provided at each crossing. A pixel electrode 22 and a common electrode 24 are provided in a pixel area 5 defined between the gate lines 2 and the data lines 4. The pixel electrode 22 and the common electrode 24 are to form a horizontal electric field. A connection line 26 connects the common electrode 24 to common electrodes of adjacent pixel areas.

One of the gate lines 2 applies a gate signal to a gate electrode of the thin film transistor 30. One of the data lines 4 applies a pixel signal to the pixel electrode 22 via a drain electrode 10 of the thin film transistor 30. The common line 26 is formed in parallel with the gate line for a pixel area 5 and is connected to the common electrodes 24 to apply a reference voltage for driving the liquid crystal 24.

The thin film transistor 30 allows the pixel signal of the data line 4 to be charged and maintained on the pixel electrode 14 in response to the gate signal of the gate line 2. The thin film transistor 30 includes a gate electrode 6 connected to one of the gate lines 2, a source electrode 8 connected to one of the data lines 4, and a drain electrode 10 connected to the pixel electrode 22. Further, the thin film transistor 30 includes an active layer 14, which is on a gate insulating film 12, overlapping the gate electrode 6, a channel between a source electrode 8 and a drain electrode 10, and an ohmic contact layer 16 for making ohmic contacts with the source electrode 8 and the drain electrode 10.

The pixel electrode 22 is provided in the pixel area 5 and is connected to the drain electrode 10 of the thin film transistor 30 via a contact hole 20 through a protective film 18. The pixel electrode 22 includes a first horizontal part 22a connected to the drain electrode 10 and provided in parallel to adjacent gate lines 2 and a second horizontal part 22b overlapping the common line 26. Further, the pixel electrode includes a finger parts 22c provided in parallel to the common electrode 24 between the first and second horizontal parts 22a and 22b.

The common electrodes 24 are connected to the common line 26 and are provided in the pixel area 5. Specifically, the common electrodes 24 is provided in parallel with the finger part 22c of the pixel electrode 22 in the pixel area 5. Accordingly, a horizontal electric field is formed between the pixel electrode 22 to which a pixel signal is supplied via the thin film transistor 30 and the common electrode 24 to which a reference voltage is supplied via the common line 26.

The horizontal electric field is formed between the finger parts 22c of the pixel electrode 22 and the common electrodes 24. Liquid crystal molecules arranged in the horizontal direction between the thin film transistor array substrate and the color filter array substrate by such a horizontal electric field are rotated due to a dielectric anisotropy of the liquid crystal molecules. Transmittance of a light transmitting through the pixel area 5 is differentiated depending upon the extent of rotation by the liquid crystal molecules, thereby implementing a gray level scale.

In the related art liquid crystal display panel of the horizontal electric field type, the liquid crystal positioned between the common electrode and the pixel electrode 22 is arranged in the same direction as the rubbing direction when no electric field is applied and at an angle when the electric field is applied. The liquid crystal has a maximum transmittance when it is aligned at an angle of 45 degrees. To this end, a horizontal electric field between the common electrode 24 and the pixel electrode 22 must maintain a specific voltage, for example, 6V as shown in FIG. 3.

The liquid crystal has a problem in that, when the horizontal electric field between the common electrode 24 and the pixel electrode 22 is more than the specific voltage, it tends to move further toward the horizontal direction of the electric field, which is more than 45 degrees, such that a deterioration in transmittance occurs.

SUMMARY OF THE INVENTION

Accordingly, the present invention is directed to a thin film transistor array substrate and a fabricating method thereof that substantially obviates one or more of the problems due to limitations and disadvantages of the related art.

Accordingly, it is an object of the present invention to provide a thin film transistor array substrate and a fabricating method thereof to improve light transmittance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a method of fabricating a thin film transistor array substrate includes the steps of forming a gate line and a data line on a substrate to define a pixel area; forming a thin film transistor in the pixel area; forming a pixel electrode connected to the thin film transistor; and forming a common electrode positioned to oppose the pixel electrode to form a closed aperture area for transmitting and shutting off light by a rotation of liquid crystal positioned within the aperture area.

In another aspect, a thin film transistor array substrate includes a plurality of aperture areas have a tetragonal shape in a pixel area defined between a gate line and a data line, wherein at least one corner angle of each aperture area is different from other corner angles.

In a further aspect, a method of fabricating a thin film transistor array substrate includes the steps of providing a gate line and data line provided on a substrate to define a pixel area, providing a thin film transistor provided in the pixel area, providing a pixel electrode connected to the thin film transistor and providing a common electrode positioned to opposed the pixel electrode to form a closed aperture area for transmitting and shutting off a light by a rotation of liquid crystal positioned within said pixel area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 5A and FIG. 5B depict an alignment direction of the liquid crystal shown in FIG. 4 according to an electric field variation.

DETAILED DESCRIPTION OF THE PREFERRED EMBODIMENTS

Reference will now be made in detail to the preferred embodiments of the present invention, examples of which are illustrated in the accompanying drawings. Hereinafter, the preferred embodiments of the present invention will be described in detail with reference to FIGS. 4 to 21.

Figure 1:
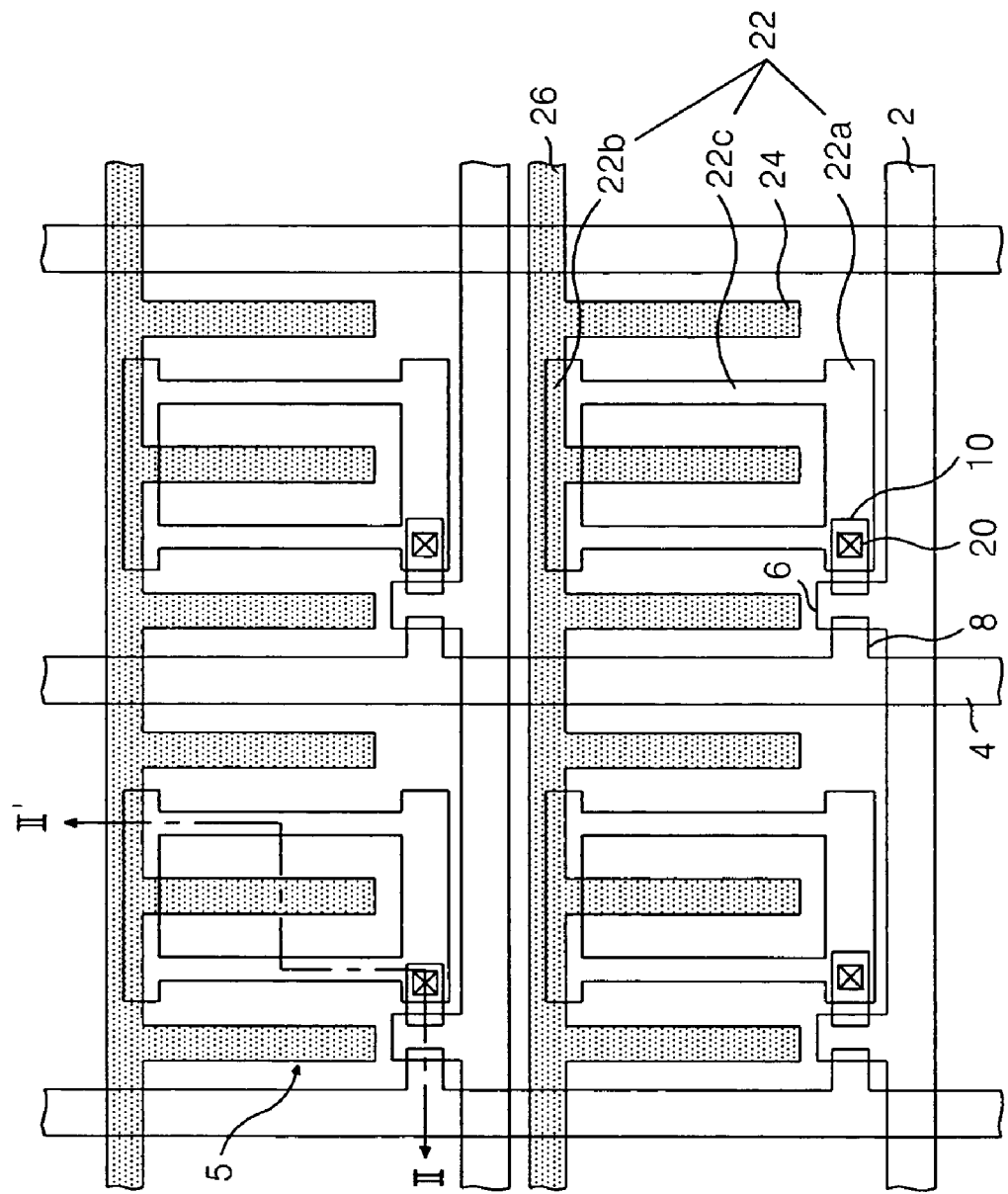
FIG. 1 is a plan view showing a structure of the related art thin film transistor array substrate of horizontal electric field applying type.
Figure 2:
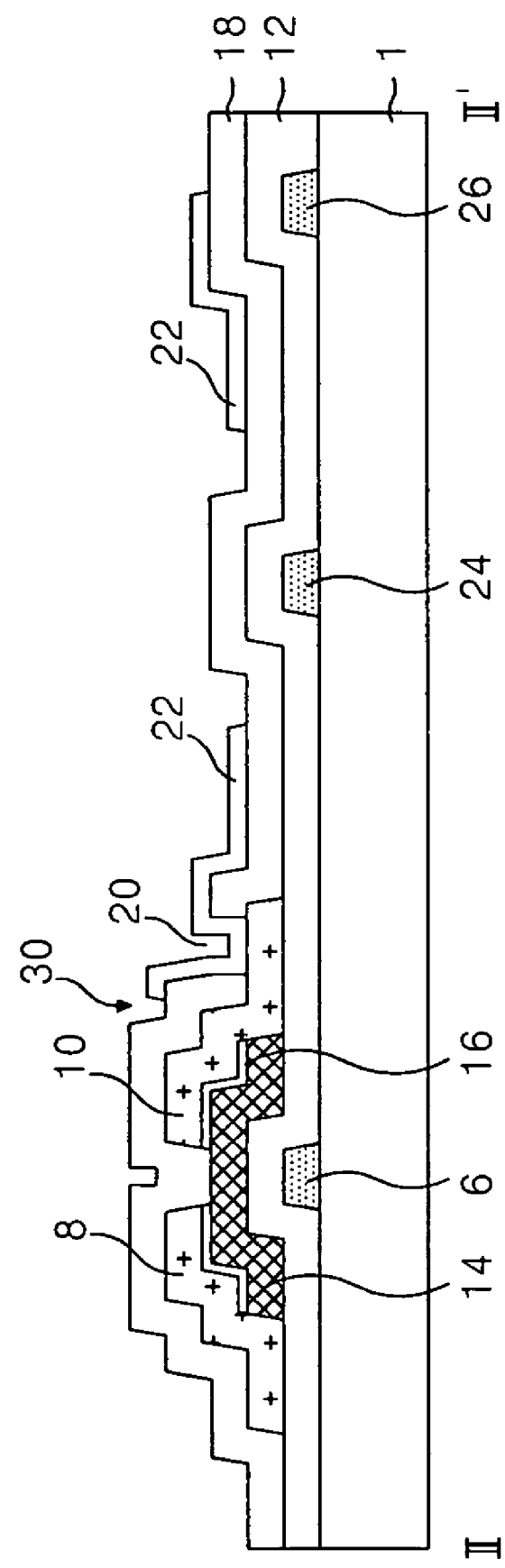
FIG. 2 is a cross-sectional view of the thin film transistor array substrate taken along the line II-II' in FIG. 1.
Figure 3:
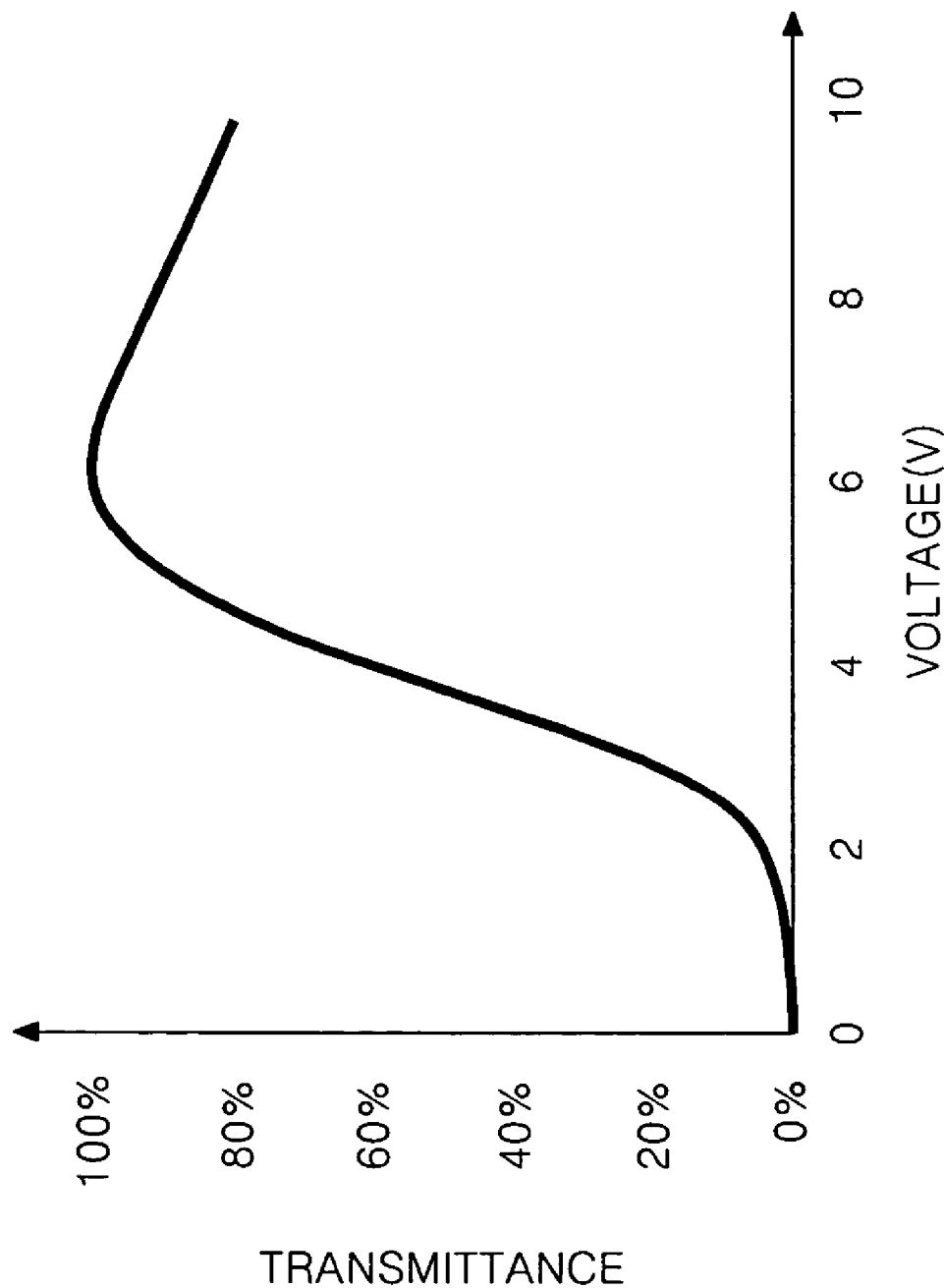
FIG. 3 is a graph showing transmittance characteristics according to an alignment of the liquid crystal shown in FIG. 1 and FIG. 2.
Figure 4:
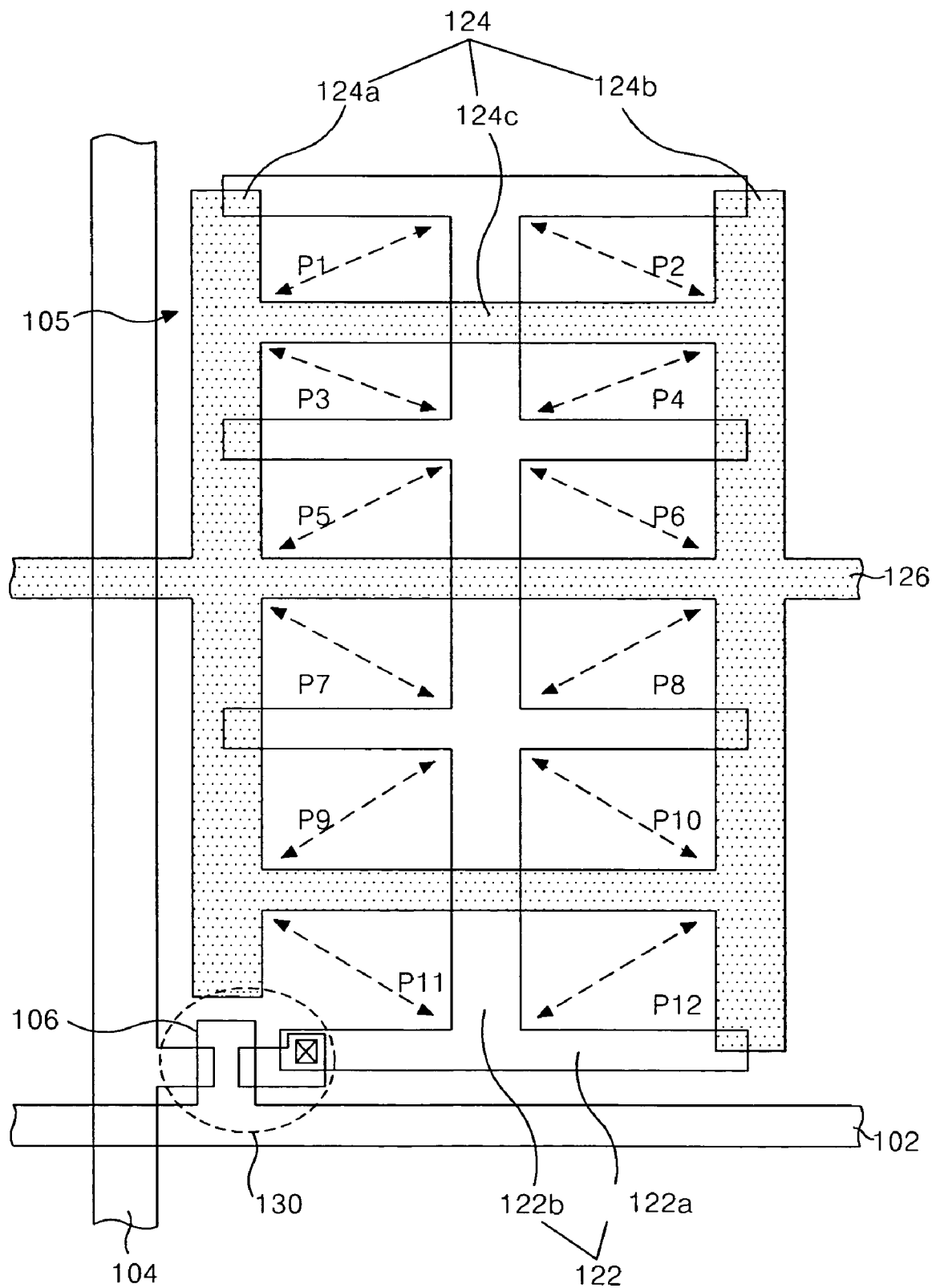
FIG. 4 is a plan view showing a structure of a thin film transistor array substrate according to a first embodiment of the present invention.

FIG. 4 is a plan view showing a structure of a thin film transistor array substrate according to a first embodiment of the present invention. Referring to FIG. 4, the thin film transistor array substrate includes a gate line 102 and a data line 104 provided on a lower substrate 101 to cross each other. A thin film transistor 130 is provided at each crossing. A pixel electrodes 122 and a common electrode 124 are provided in a pixel area 105 defined by the gate line 102 and the data line 104. The pixel electrode 122 and the common electrode 124 are to form a horizontal electric field in the pixel area 5. A connection line 126 connects the common electrode 124 to common electrodes of adjacent pixel areas.

The gate line 102 applies a gate signal to a gate electrode 106 of the thin film transistor 130. The data line 104 applies a pixel signal to the pixel electrode 122 via the thin film transistor 130. The thin film transistor 130 allows the pixel signal of the data line 104 to be charged and maintained on the pixel electrode 122 in response to the gate signal of the gate line 102.

The pixel electrode 122 is connected to a drain electrode of the thin film transistor 130 and is provided in the pixel area 105. The pixel electrode 122 includes a horizontal part 122a formed in parallel to the gate line 102. Further, the pixel electrode 122 includes a vertical part 122b connected to each horizontal part 122a and formed in parallel to the data line 104.

The common electrode 124 is connected to the connection line 126 and is provided in the pixel area 105. The common electrode 124 includes first and second vertical parts 124a and 124b formed in parallel to the vertical part 122b of the pixel electrode 122. Further, the common electrode 124 includes a horizontal part 124c formed in parallel to the gate line 102 between the first and second vertical parts 124a and 124b.

In the thin film transistor array substrate shown in FIG. 4, a horizontal electric field is formed between the pixel electrode 122 to which a pixel signal is supplied via the thin film transistor 130 and the common electrode 124 to which a reference voltage is supplied via the connection line 126. Liquid crystal molecules arranged in the horizontal direction between the thin film transistor array substrate and the color filter array are rotated by such a horizontal electric field due to dielectric anisotropy of the liquid crystal molecules. Transmittance of a light transmitting through the pixel area 5 is differentiated depending upon the extent of the rotation by the liquid crystal molecules such that a gray level scale can be implemented.

The pixel area 105 defined by the data line 104 and the gate line 102 includes a plurality of closed aperture areas P1-P12 for transmitting and shutting off light by rotation of the liquid crystal. Each aperture area has a rectangular or square shape defined by the common electrode 124 and the pixel electrode 122. To this end, the common electrode (or pixel electrode) at each aperture area has an "L" shape while the pixel electrode (or common electrode) has an inverse "L" shape symmetrical to the common electrode (or pixel electrode) in a diagonal direction.

Figure 6:
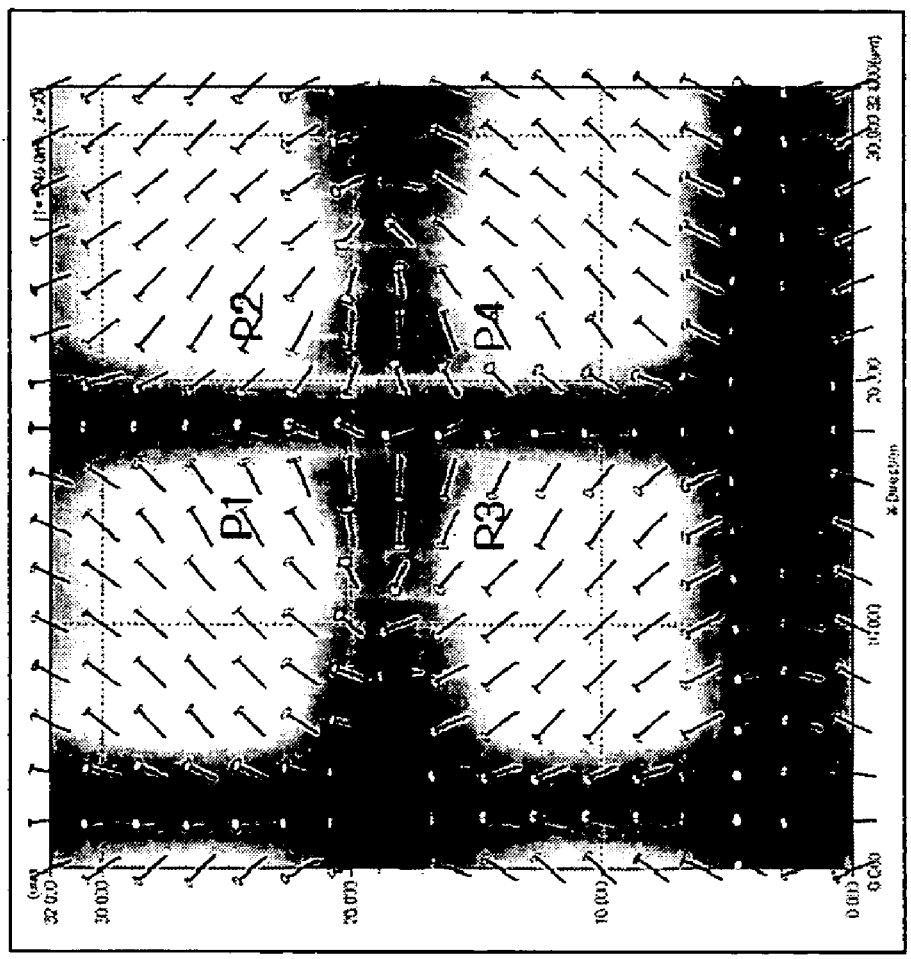
FIG. 6 is a plan view showing a motion of the liquid crystal positioned within a plurality of aperture areas shown in FIG. 4.
Figure 7:
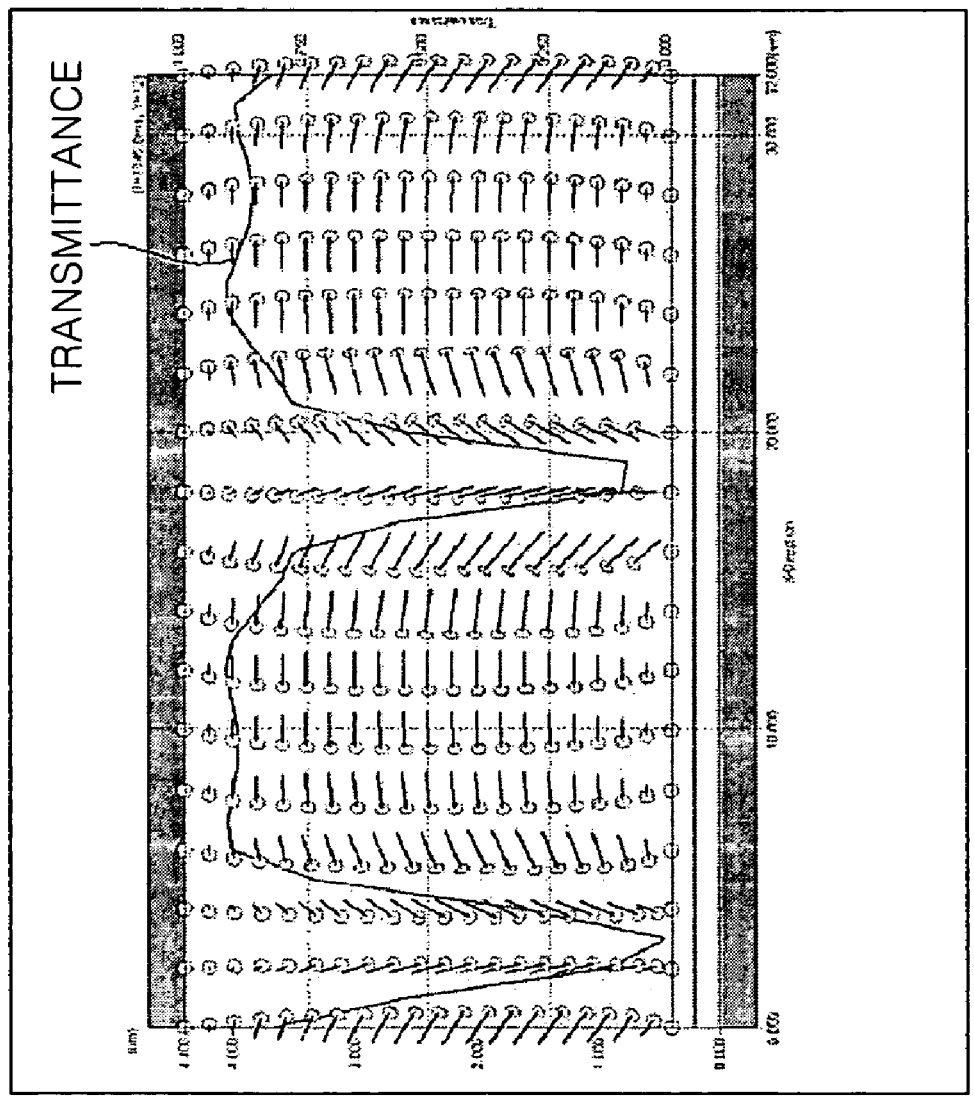
FIG. 7 illustrates transmittance characteristics according to an alignment of the liquid crystal shown in FIG. 4.
Figure 8:
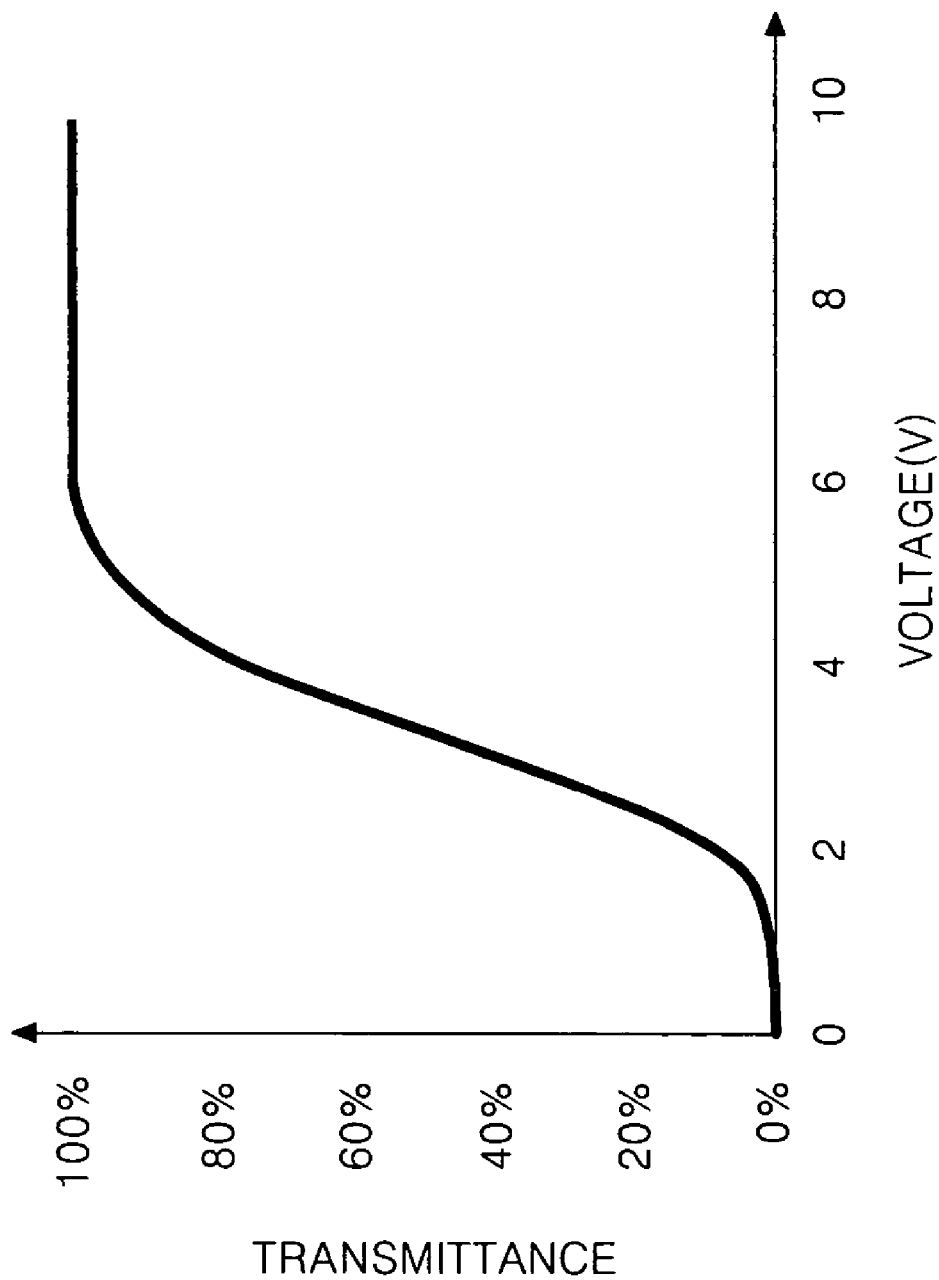
FIG. 8 is a graph showing a voltage to transmittance characteristic of a liquid crystal display including the thin film transistor array substrate shown in FIG. 4.

FIG. 5A and FIG. 5B depict an alignment direction of the liquid crystal shown in FIG. 4 according to an electric field variation. FIG. 6 is a plan view showing a motion of the liquid crystal positioned within a plurality of aperture areas shown in FIG. 4. FIG. 7 illustrates transmittance characteristics according to an alignment of the liquid crystal shown in FIG. 4. FIG. 8 is a graph showing a voltage to transmittance characteristic of a liquid crystal display including the thin film transistor array substrate shown in FIG. 4.

The liquid crystal positioned within each aperture area P1-P12 has an initial alignment state, as shown in FIG. 5A, when no voltage is applied. On the other hand, when a voltage is applied to the common electrode 124 and the pixel electrode 122 positioned at each aperture area, then the liquid crystal is aligned in a direction parallel to the electric field direction (as indicated by the dotted lines) distributed between the common electrode 124 and the pixel electrode 122, as shown in FIG. 4 and FIG. 5B. Due to such an electric field distribution, an alignment direction of the liquid crystal within one pixel area 105 has a multi-domain structure in which the domains are symmetrical to each other, as shown in FIG. 6. Accordingly, birefringence corresponding to the liquid crystal alignment direction can be cancelled with respect to each other, to thereby minimize a color shift phenomenon and enlarge an area having no gray level inversion.

As mentioned above, since an electric field between the common electrode 124 and the pixel electrode 122 within each aperture area is in a direction of 45 degrees, an alignment direction of the liquid crystal maintains the 45 degree even though a higher voltage is applied. For instance, as shown in FIG. 7 and FIG. 8, even though a maximum brightness voltage, i.e., a voltage of more than 6V is applied, light transmittance within each aperture area is not lowered and a maximum transmittance value is maintained.

Figure 9:
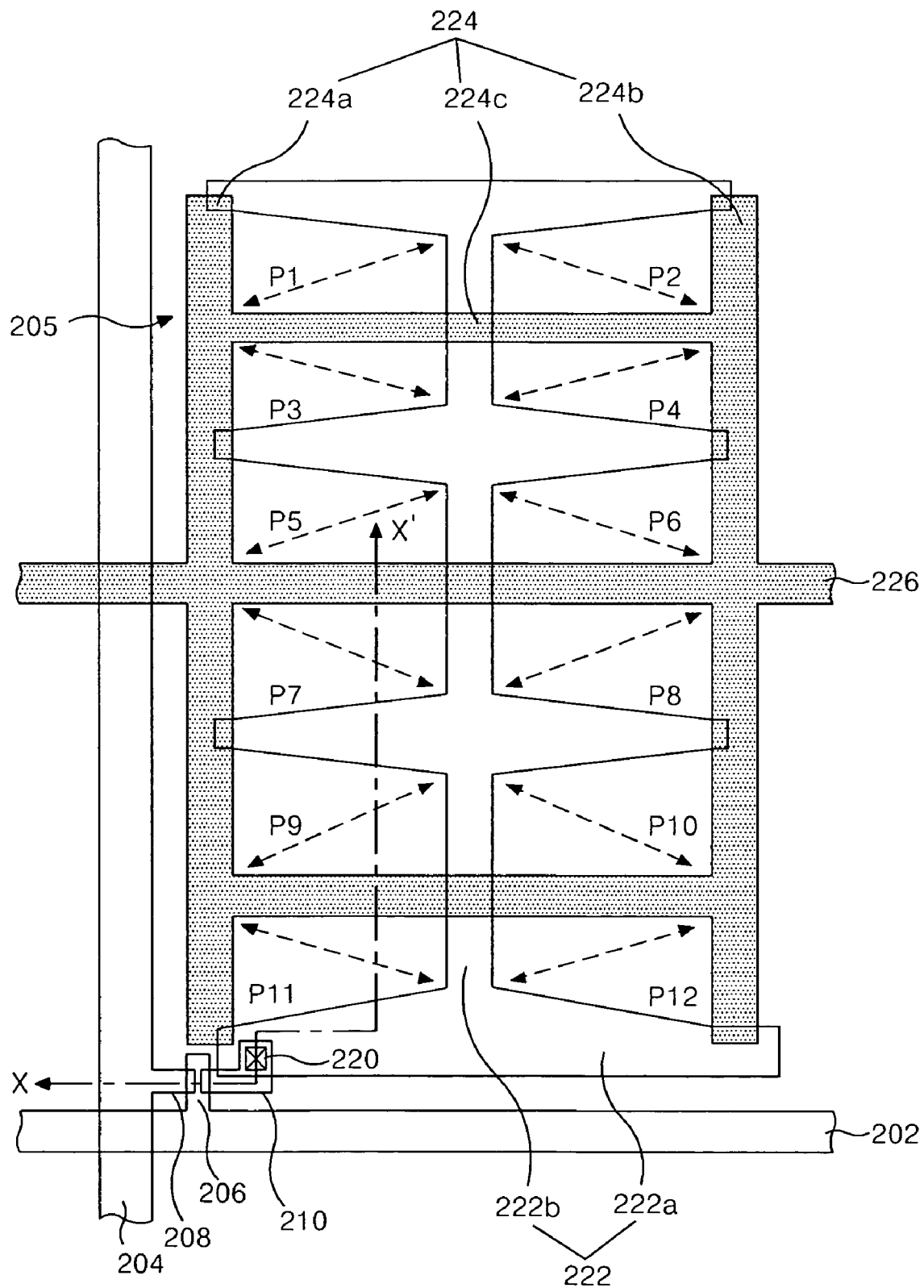
FIG. 9 is a plan view showing a structure of a thin film transistor array substrate according to a second embodiment of the present invention.
Figure 10:
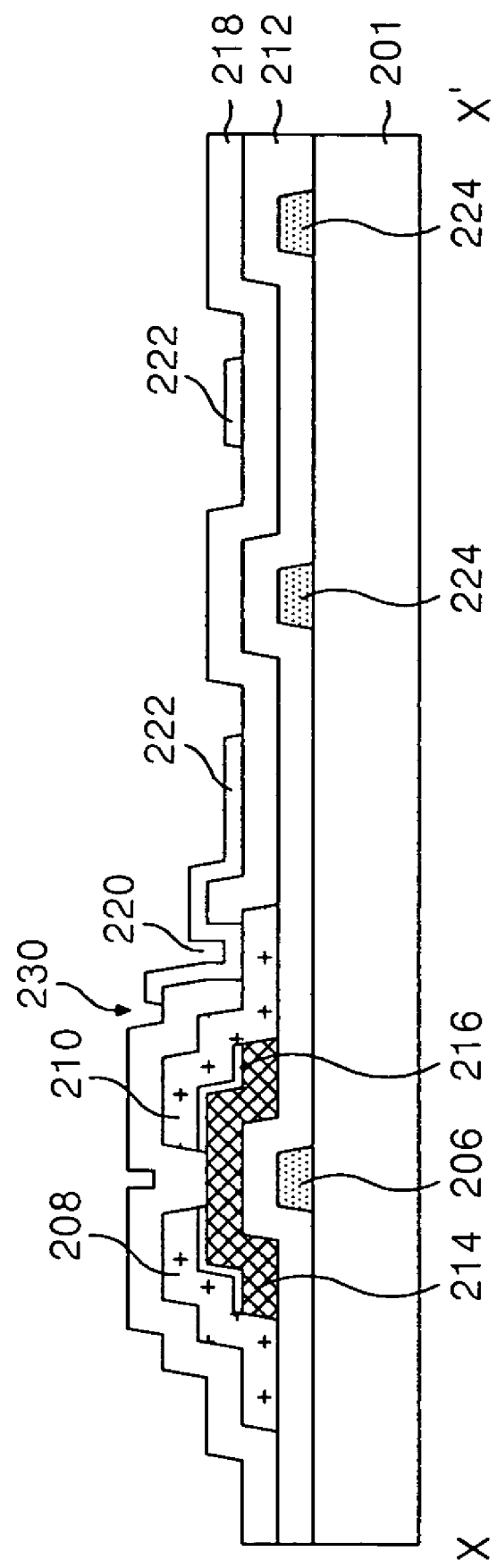
FIG. 10 is a cross-sectional view of the thin film transistor array substrate taken along the line X-X' in FIG. 9.

FIG. 9 is a plan view showing a structure of a thin film transistor array substrate according to a second embodiment of the present invention; and FIG. 10 is a cross-sectional view of the thin film transistor array substrate taken along the line X-X' in FIG. 9. Referring to FIG. 9 and FIG. 10, the thin film transistor substrate includes a gate line 202 and a data line 204 provided on a lower substrate 201 to cross each other. A thin film transistor 230 is provided adjacent to each crossing. A pixel electrode 222 and a common electrode 224 are provided in a pixel area defined by the gate line 202 and the data line 204. The pixel electrode 222 and the common electrode 224 are for forming a horizontal electric field in the pixel area. A connection line 226 connects the common electrode 224 to common electrodes of adjacent pixel areas.

The gate line 202 applies a gate signal to a gate electrode 206 of the thin film transistor 230. The data line 204 applies a pixel signal to the pixel electrode 222 via the thin film transistor 230. The thin film transistor 230 allows the pixel signal of the data line 204 to be charged and maintained on the pixel electrode 222 in response to the gate signal of the gate line 202.

The thin film transistor 230 includes a gate electrode 206 connected to the gate line 202, a source electrode 208 connected to the data line 204, and a drain electrode 210 connected to the pixel electrode 222. Further, the thin film transistor 230 includes an active layer 214 overlapping the gate electrode 206 with a channel between the source electrode 208 and the drain electrode 210, and an ohmic contact layer 216 for ohmic contacts with the source electrode 208 and the drain electrode 210. A gate insulating film 212 is positioned between the active layer 214 and the gate electrode 206.

The pixel electrode 222 is provided in the pixel area. The pixel electrode 222 is connected to the drain electrode 210 of the thin film transistor 230 via a contact hole 220 going through a protective film 218. Particularly, the pixel electrode 222 includes a horizontal part 222a formed in parallel to the gate line 202, and a vertical part 222b connected to each horizontal part 222a and formed in parallel to the data line 204.

The common electrode 224 is connected to the connection line 226 and is provided in the pixel area. The common electrode 224 includes first and second vertical parts 224a and 224b formed in parallel to the vertical part 222b of the pixel electrode 222. Further, the common electrode 224 includes, a horizontal part 224c formed in parallel to the gate line 202 between the first and second vertical parts 224a and 224b.

A horizontal electric field is formed between the pixel electrode 222 to which a pixel signal is supplied via the thin film transistor 230 and the common electrode 224 to which a reference voltage is supplied via the connection line 226. Liquid crystal molecules arranged in the horizontal direction between the thin film transistor array substrate and the color filter array substrate are rotated by such a horizontal electric field due to a dielectric anisotropy of the liquid crystal molecules. Transmittance of a light transmitting through the pixel area 5 is differentiated depending upon the extent of rotation of the liquid crystal molecules such that a gray level scale is implemented.

The pixel area 205 defined between the data line 204 and the gate line 202 includes a plurality of aperture areas P1 to P12 that each have a trapezoidal shape defined by the common electrode 224 and the pixel electrode 222. The horizontal part 222a of the pixel electrode 222 can have a width narrower than at the center of the pixel area 205, as shown in FIG. 9. More specifically, the common electrode in each aperture area has a perpendicularly bent "L" shape while the pixel electrode has an "L" shape opposed to the common electrode in a diagonal direction and bent at an obtuse angle that is greater than 90 degrees and smaller than 150 degrees. Thus, the angle between two sides of the pixel electrode 222a and 222b is greater than 90 degrees.

Figure 11:
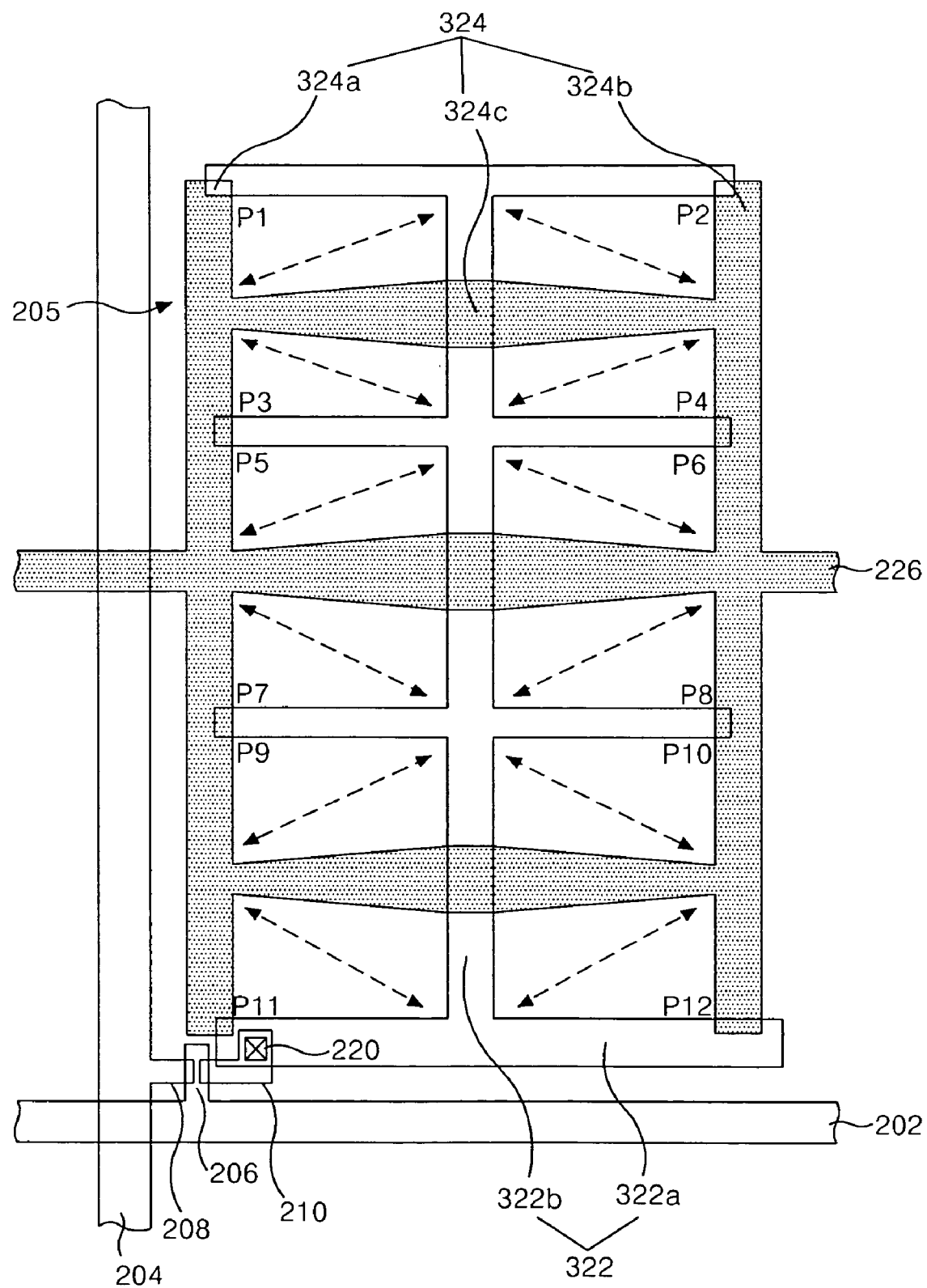
FIG. 11 is a plan view showing a structure of a thin film transistor array substrate according to a third embodiment of the present invention.

FIG. 11 is a plan view showing a structure of a thin film transistor array substrate according to a third embodiment of the present invention. The pixel area 205 defined between the data line 204 and the gate line 202 includes a plurality of aperture areas P1 to P12 that each have a trapezoidal shape defined by the common electrode 324 and the pixel electrode 322. The angle between two sides of the common electrode can be less than 90 degrees. For example, the pixel electrode in each aperture area has a perpendicularly bent "L" shape while the common electrode has an "L" shape opposed to the pixel electrode in a diagonal direction and bent at an acute angle. As shown in FIG. 11, the horizontal parts 324a or 324b of the common electrode 324 and the vertical side 324c of the common electrode 324 can have an "L" shape bent at an acute angle. More particularly, the angle between two sides of the common electrode 324 is less than 90 degrees and greater than 30 degrees.

Figure 12A:
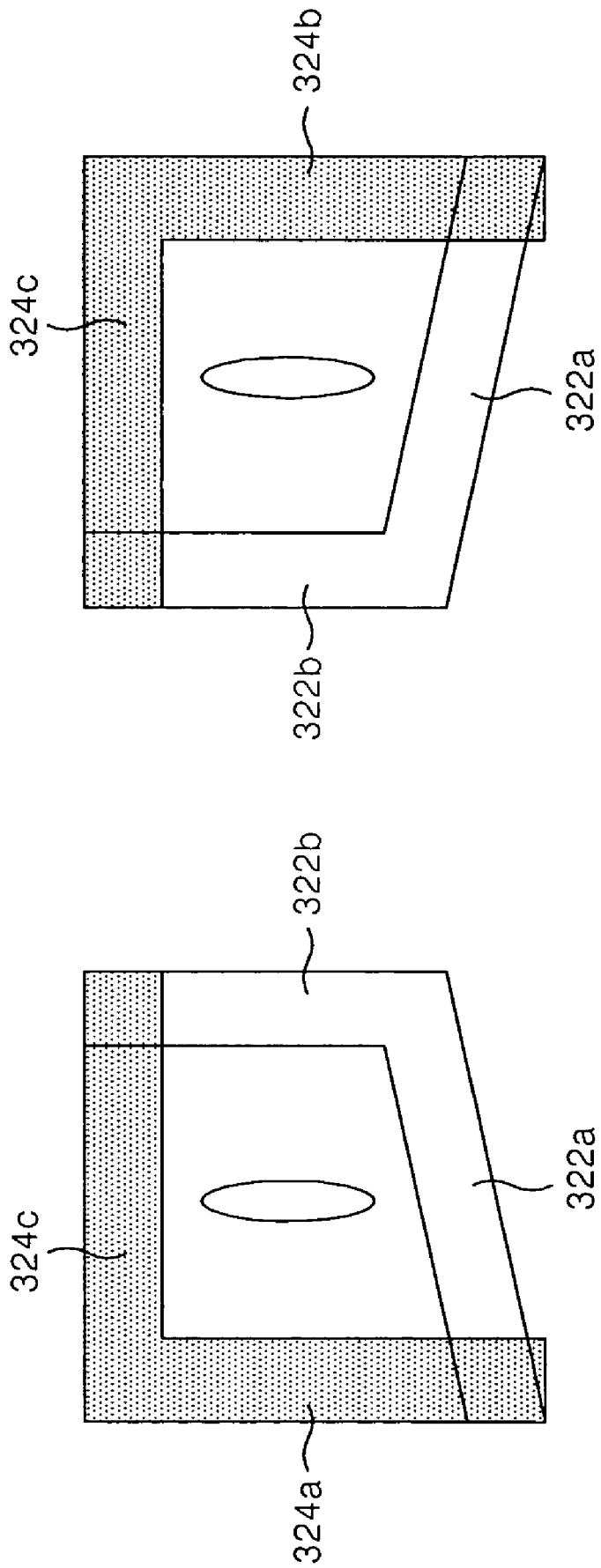
FIG. 12A and FIG. 12B depict an alignment direction of the liquid crystal shown in FIG. 9 and FIG. 10 according to an electric field variation.
Figure 12B:
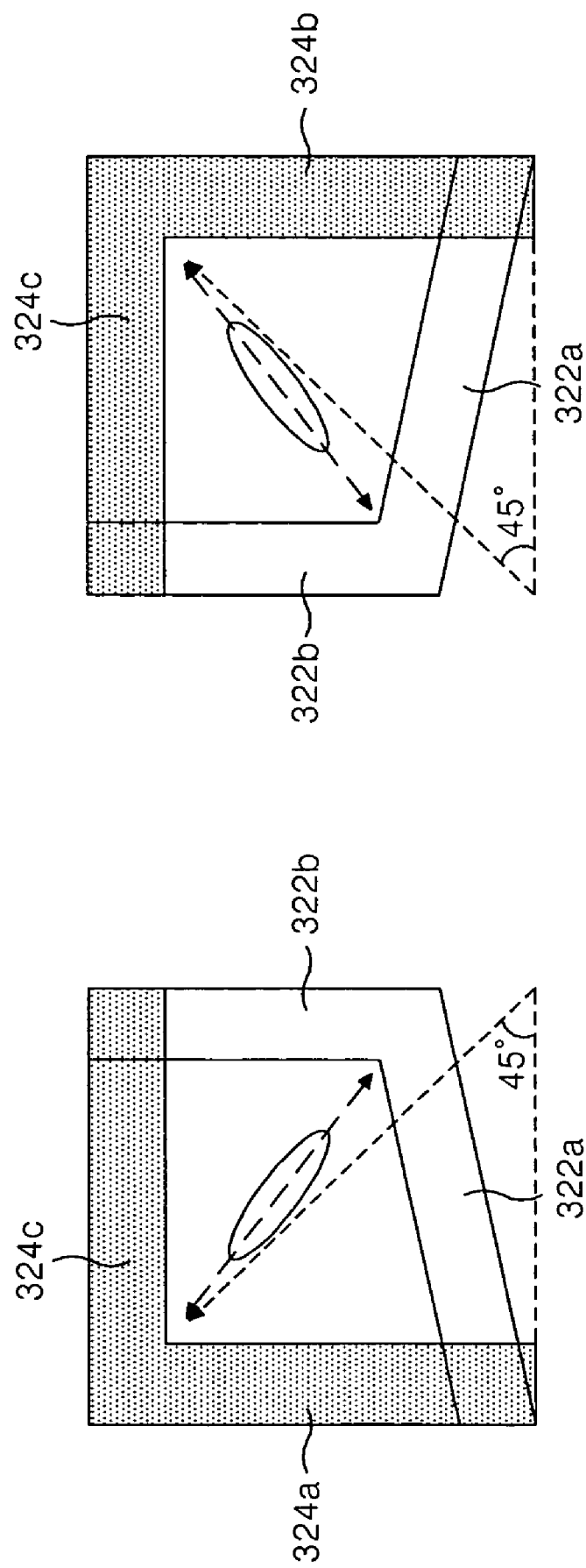

The liquid crystal positioned within each aperture area defined between the common electrode 224 and the pixel electrode 222 has an initial alignment state, as shown in FIG. 12A when no voltage is applied. On the other hand, if a voltage is applied to the common electrode 224 and the pixel electrode 222, then the liquid crystal is aligned in a direction parallel to the electric field direction (as indicated by the dotted lines) distributed between the common electrode 224 and the pixel electrode 222, as shown in FIG. 9 and FIG. 12B. Due to such an electric field distribution, an alignment direction of the liquid crystal within one pixel area has a multidomain structure in which the domains are symmetrical to each other, as shown in FIG. 9 and FIG. 11. Accordingly, birefringence corresponding to the liquid crystal alignment direction can be cancelled with respect to each other, to thereby minimize a color shift phenomenon and enlarge an area having no gray level inversion.

As mentioned above, an electric field between the common electrode 224 and the pixel electrode 222 within each aperture area has a distance between the electrodes that narrows near the center of the horizontal part of any one of the common electrode 224 and the pixel electrode 222, which is formed in an inclined shape, to thereby be distributed in a direction of 45 degrees to 65 degrees. Thus, an alignment direction of the liquid crystal is maintained at 45 degrees to 65 degrees.

Figure 13:
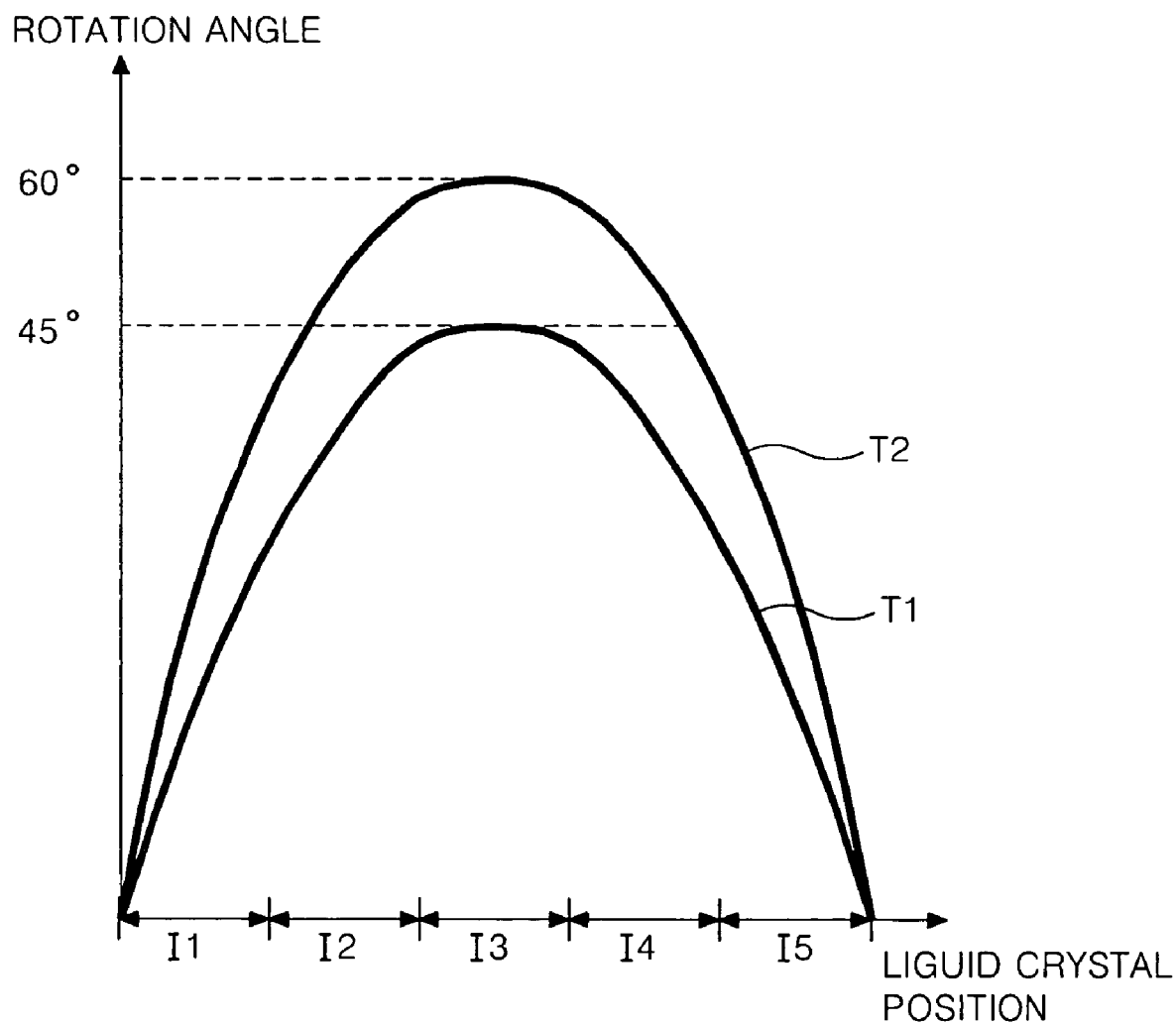
FIG. 13 is a graph shown liquid crystal characteristic of the thin film transistor array substrate according to the embodiments of the present invention.

FIG. 13 shows rotation angles of the liquid crystal according to a position of the liquid crystal in the first and second embodiments of the present invention. In FIG. 13, the horizontal axis represents a liquid crystal position between the upper and lower substrates wherein a first area I1 represents the liquid crystal adjacent to the upper substrate; a fifth area I5 is the liquid crystal adjacent to the lower substrate; a third area I3 is the liquid crystal positioned at the center of the cell; a second area I2 is the liquid crystal positioned between the first area I1 and the third area I3; and a fourth area I4 is the liquid crystal positioned between the third area I3 and the fifth area I5, and the vertical axis represents a rotation angle of the liquid crystal when an electric field is applied. Further, a first curve T1 represents a rotation angle of the liquid crystal according to the first embodiment while a second curve T2 represents a rotation angle of the liquid crystal according to the second embodiment of the present invention.

In view of the first curve T1, when a voltage is applied to the pixel electrode and the common electrode according to the first embodiment of the present invention, the liquid crystal positioned at the first and fifth areas I1 and I5 at the outer portions of the cell keeps an initial state of voltage alignment that is rotated into a direction smaller than 45 degrees while the liquid crystal positioned at the center I3 of the cell is rotated into a direction of 45 degrees. As mentioned above, in the liquid crystal according to the first embodiment of the present invention, an average rotation angle is decreased by the liquid crystal positioned at the outer portion of the cell to thereby have a relatively small change in transmittance due to increased voltages.

As shown by the T2 curve, when a voltage is applied to the pixel electrode and the common electrode according to the second embodiment of the present invention, the liquid crystal positioned at the outer portions I1 and I5 of the cell adjacent to the upper and lower substrates keeps an initial state of voltage alignment, but is rotated at an angle larger than the liquid crystal according to the first embodiment of the present invention. Also, the liquid crystal positioned at the second and fourth areas I2 and I4 of the cell is rotated in a direction of 45 degree. In other words, in the second embodiment of the present invention, a liquid crystal area rotated in a direction of 45 degree is more enlarged than a liquid crystal area in the first embodiment of the present invention. As mentioned above, in the liquid crystal according to the second embodiment of the present invention, if a voltage is applied, then the liquid crystal positioned at the second and fourth areas I2 and I4 of the cell is stably rotated in a direction of 45 degree in an enlarged liquid crystal area, thereby having a relatively large average transmittance.

Figure 14A:
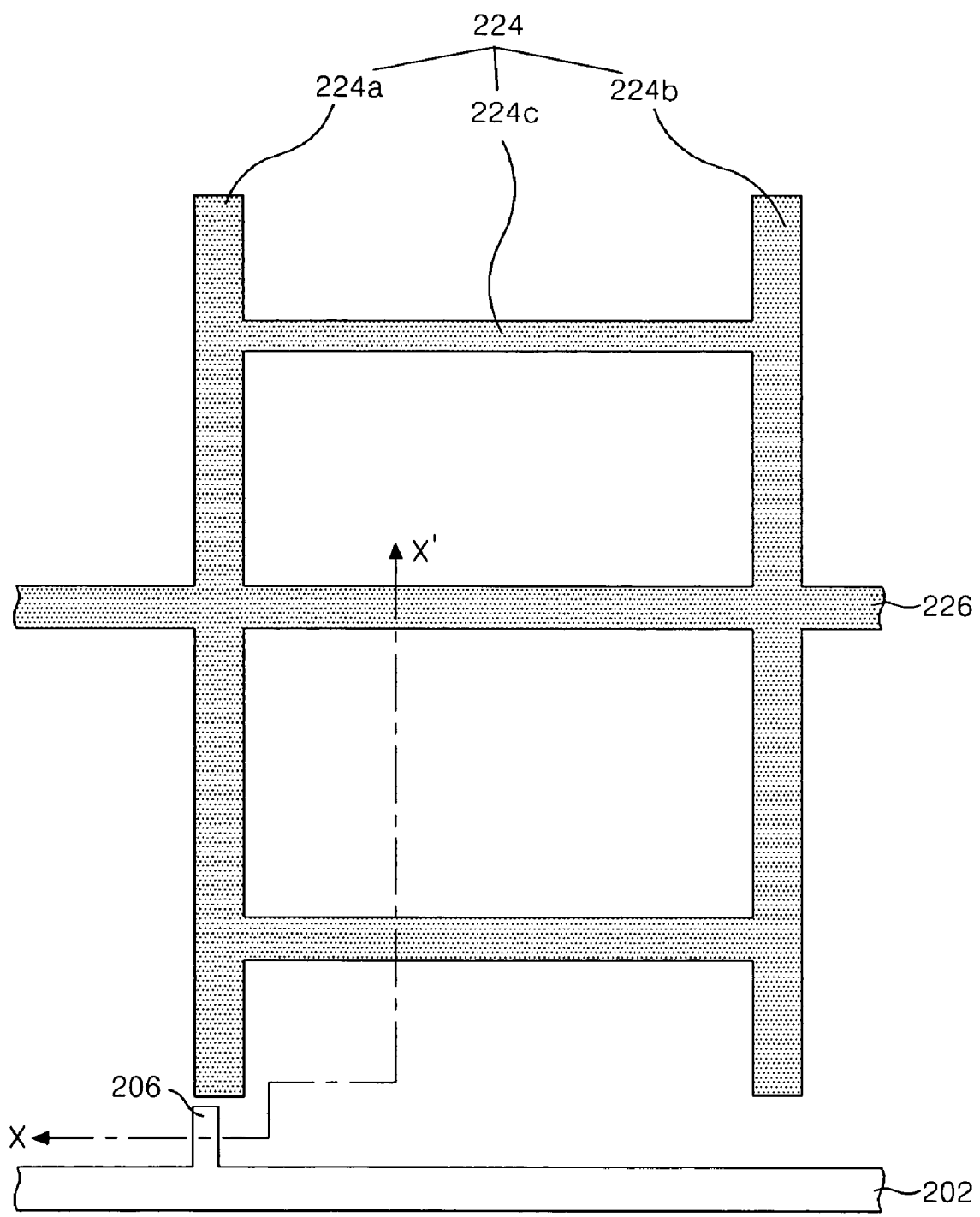
FIG. 14A to FIG. 18B are plan views and cross-sectional views for explaining a method of fabricating the thin film transistor array substrate shown in FIG. 9 and FIG. 10.
Figure 14B:
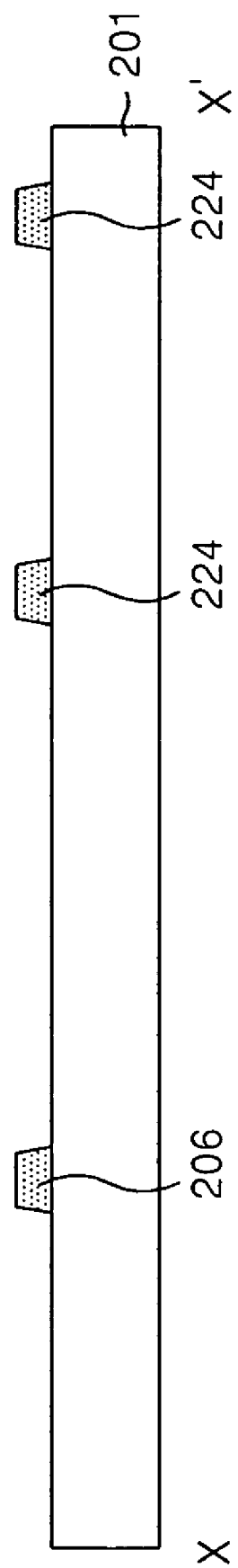

FIG. 14A to FIG. 18B are plan views and cross-sectional views for explaining a method of fabricating the thin film transistor array substrate shown in FIG. 9 and FIG. 10. Referring to FIG. 14A and FIG. 14B, a first conductive pattern including the gate line 202, the gate electrode 206, the connection line 226 and the common electrode 224 is provided on the lower substrate 201. More specifically, a gate metal layer is formed on the lower substrate 201 by a deposition method, such as sputtering. The gate metal layer is formed of one of aluminum or aluminum alloys, copper (Cu) and chrome (Cr). The gate metal layer is patterned by photolithography (a first mask) and an etching process, to thereby provide a first conductive pattern group including the gate line 202, the gate electrode 206 connected to the gate line 202, the common electrode 224 having the first and second vertical parts 224a and 224b and the horizontal part 224c and a connection line 226 for interconnecting to common electrodes in adjacent pixel area to each other.

Figure 15A:
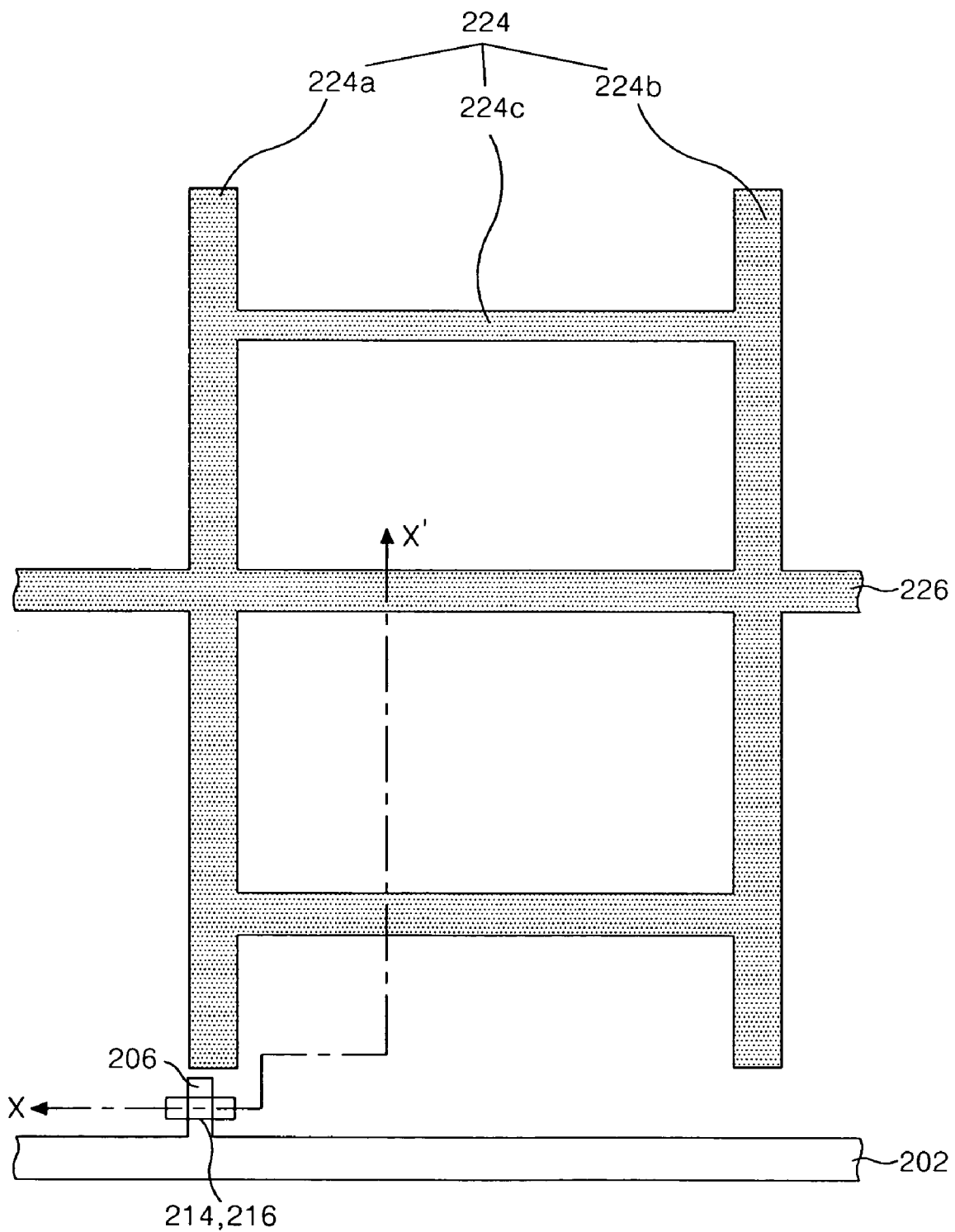
Figure 15B:
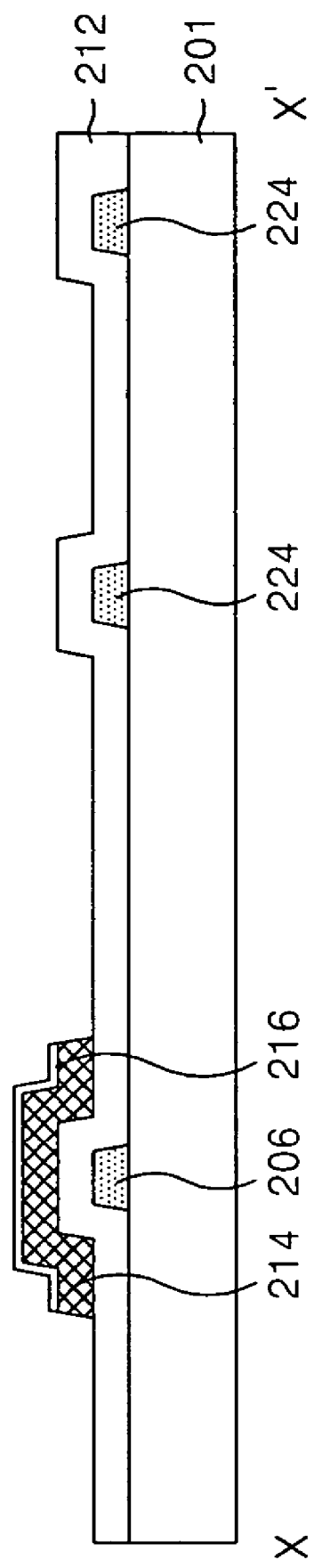

Referring to FIG. 15A and FIG. 15B, the gate insulating film 212 is formed on the lower substrate 201 provided with the first conductive pattern group. Then, the semiconductor pattern including the active layer 214 and the ohmic contact layer 216 is formed on the gate insulating film 212. More specifically, the gate insulating film 212 and the first and second semiconductor layers are sequentially formed on the lower substrate 201 provided with the first conductive pattern group by a deposition method, such as sputtering. The gate insulating film 212 is formed of an inorganic insulating material, such as silicon oxide ($SiO_x$) and silicon nitride ($SiN_x$). The first semiconductor layer is formed from an undoped amorphous silicon while the second semiconductor layer is formed from amorphous silicon doped with a P-type impurity. Then, the first and second semiconductor layers are patterned by photolithography and an etching process (second mask), to thereby provide the semiconductor pattern including the active layer 214 and the ohmic contact layer 216.

Figure 16A:
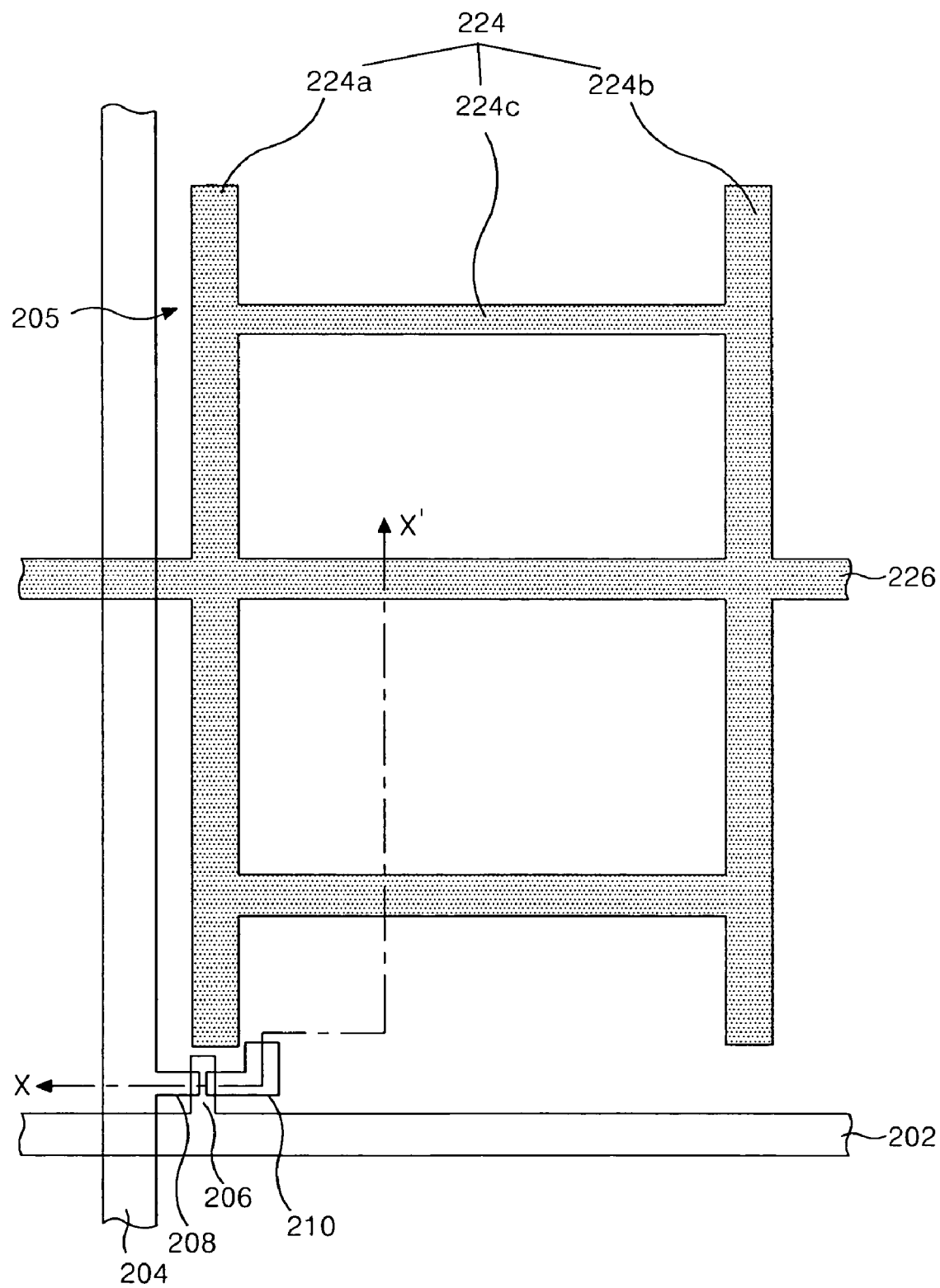

Referring to FIG. 16A and FIG. 16B, a data metal layer is formed on the gate insulating film 212 provided with the semiconductor pattern by a deposition method, such as sputtering. The data metal layer are formed of one of copper (Cu), molybdenum (Mo), titanium, tantalum and a molybdenum alloy, etc. The data metal layer is patterned by photolithography (a third mask) and an etching process to thereby provide a data pattern including the data line 204, the source electrode 208 and the drain electrode 210. Subsequently, the ohmic contact layer 216 of the channel portion exposed by the source and drain electrodes 208 and 210 is dry-etched using the source and drain electrodes 208 and 210 as a mask, to thereby expose the active layer 214 of the channel portion.

Figure 17A:
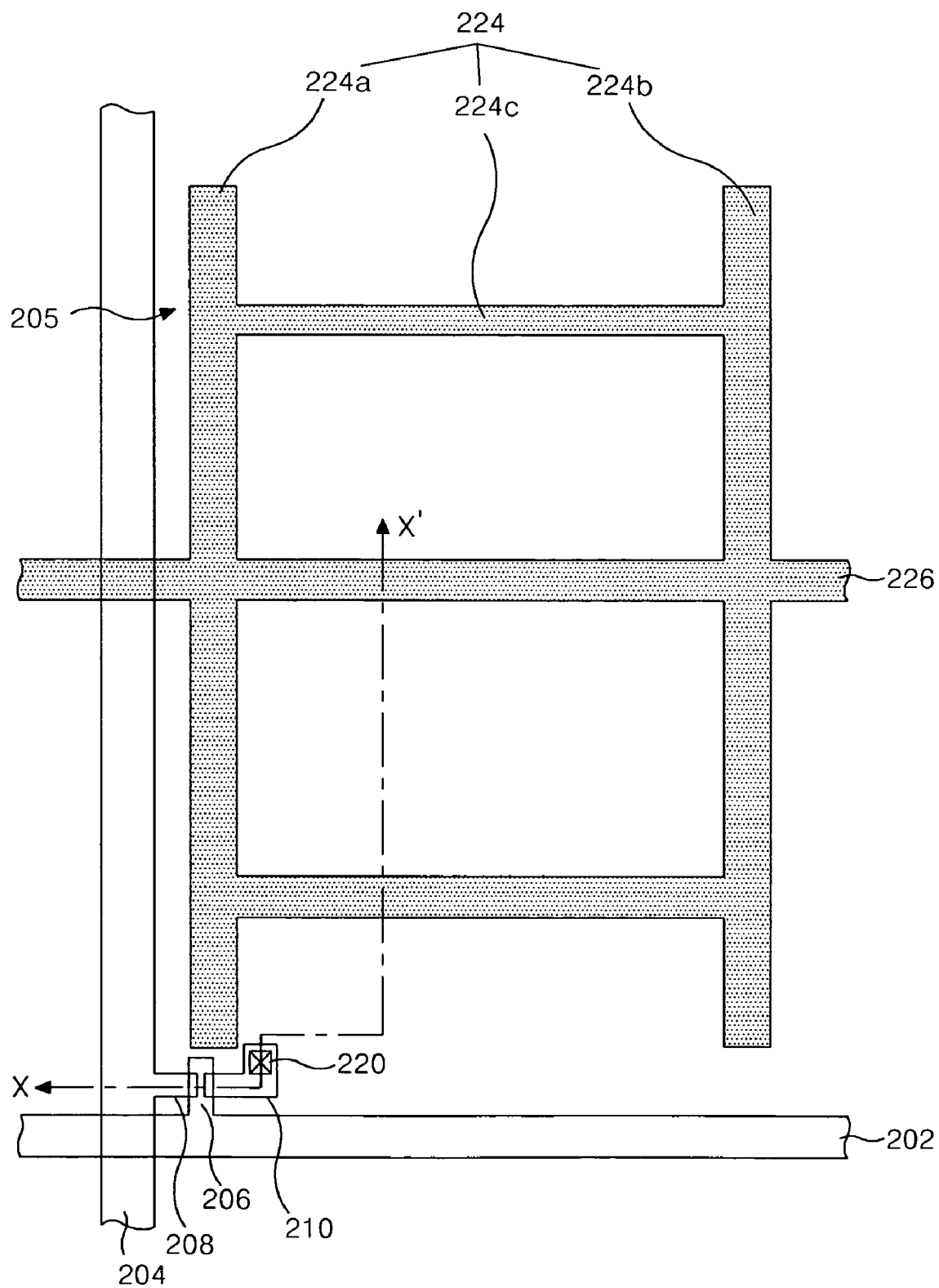

Referring to FIG. 17A and FIG. 17B, the protective film 218 including the contact hole 220 is formed on the gate insulating film 212. The protective film is formed over the gate insulating film 212 provided with the second conductive pattern group by a deposition method, such as PECVD. The protective film 218 is formed of an inorganic insulating material identical to the gate insulating film 212, or an inorganic insulating material, such as an acrylic organic compound having a low dielectric constant, such as BCB and PFCB, etc. The protective film 218 is patterned by a photolithography (a fourth mask) and an etching process to thereby provide the contact hole 220. The contact hole 220 goes through the protective film 218 to expose the drain electrode 210.

Figure 18A:
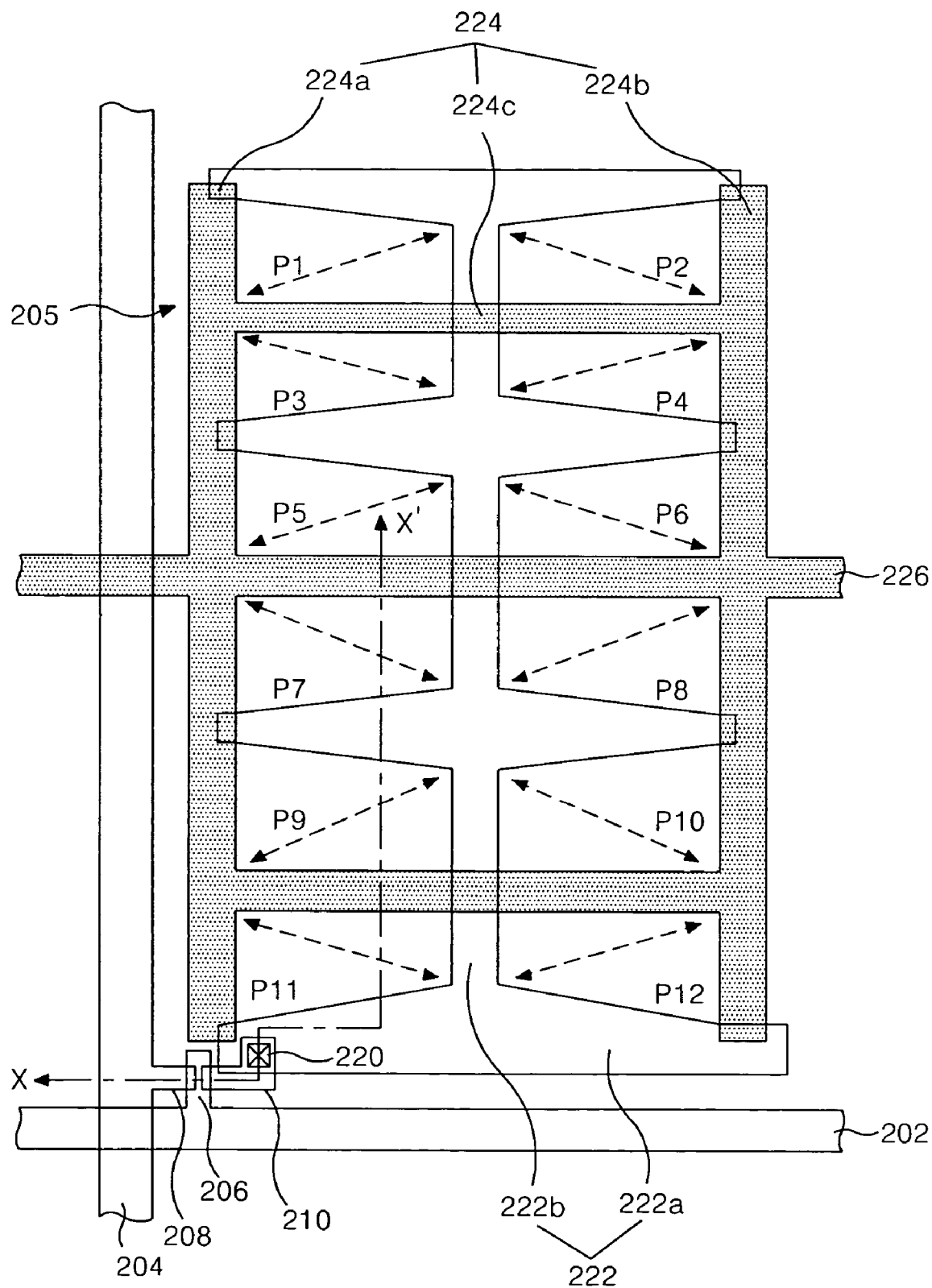
Figure 18B:
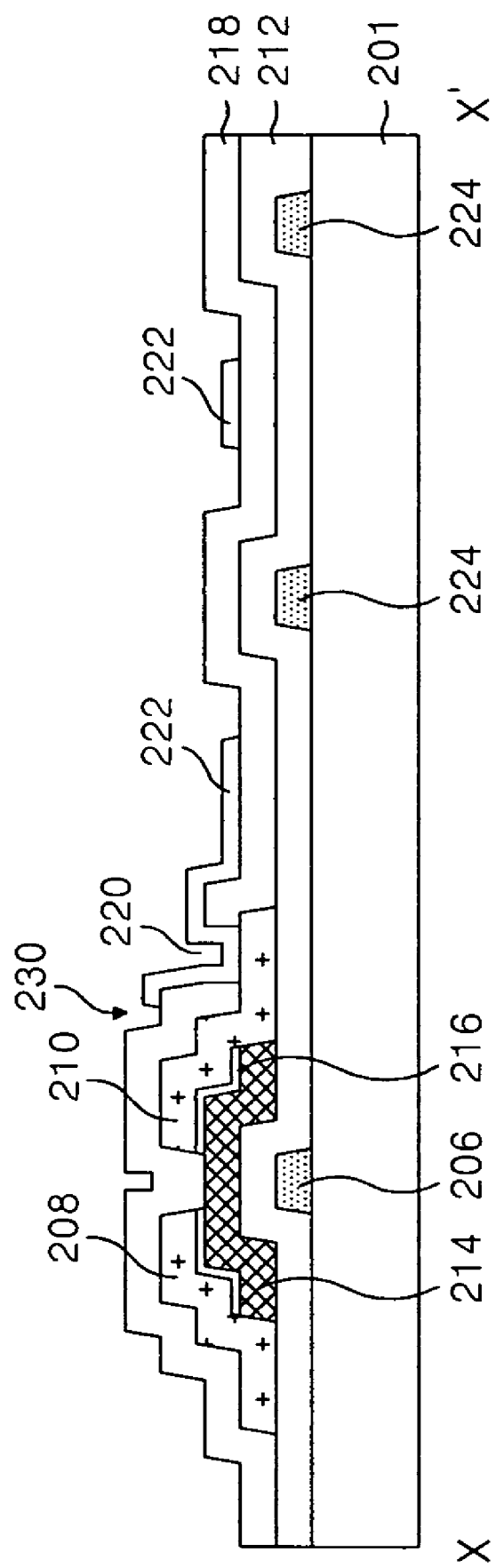

Referring to FIG. 18A and FIG. 18B, a third conductive pattern group including the pixel electrode 222 is formed on the protective film 218. A transparent conductive film is coated onto the protective film 218 by a deposition method, such as sputtering. The transparent conductive film is formed of one of indium-tin-oxide (ITO), tin-oxide (TO), indium-zinc-oxide (IZO) and indium-tin-zinc-oxide (ITZO), for example. The transparent conductive film is patterned by photolithography (a fifth mask) and an etching process, to thereby provide the third conductive pattern group including the pixel electrode 222. The pixel electrode 222 is electrically connected to the drain electrode 210 via the contact hole 220. The pixel electrode 222, along with the common electrode 224, is provided in parallel to the gate line 202 to generate a horizontal electric field along with the common electrode.

Figure 19:
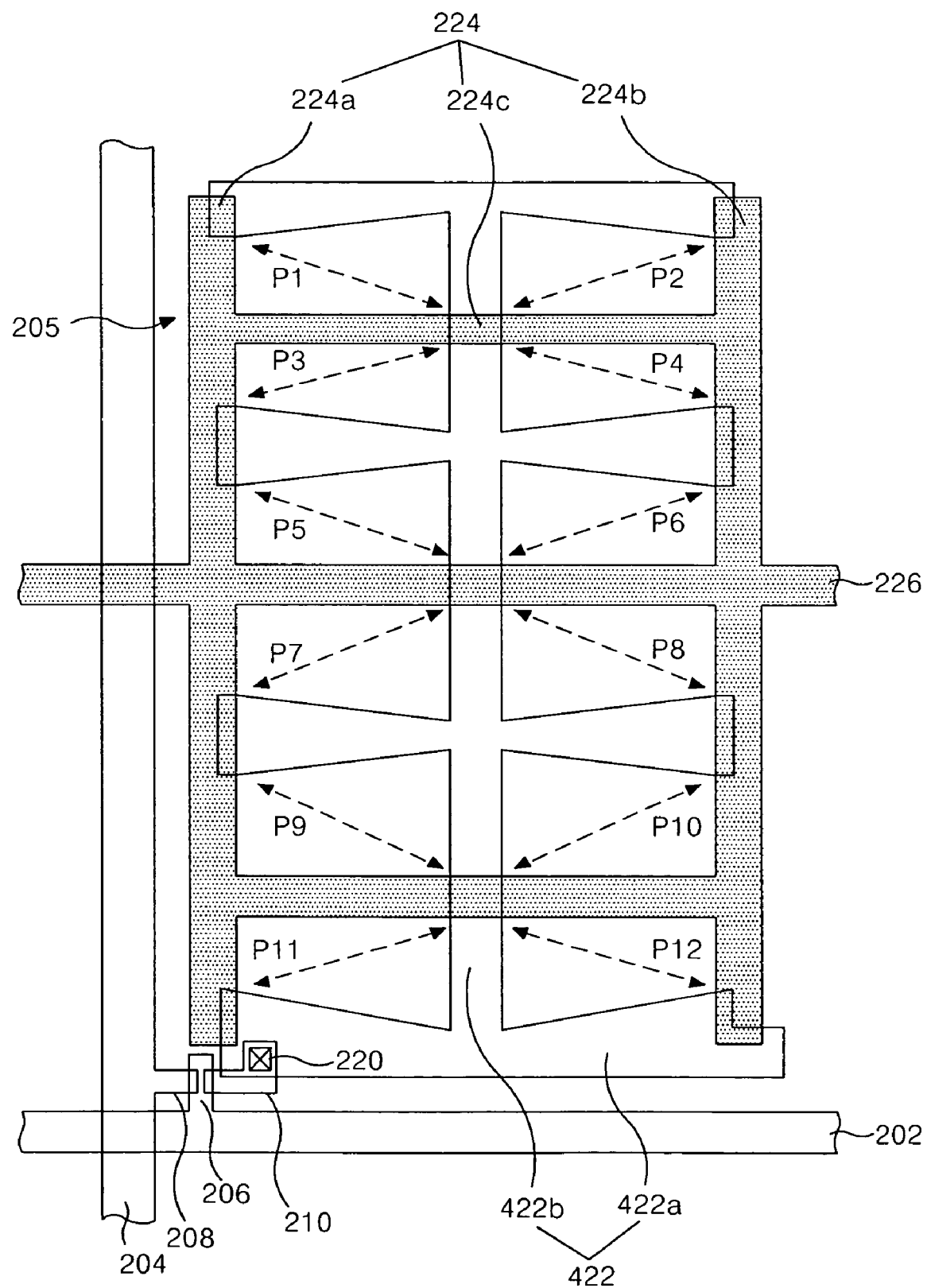
FIG. 19 is a plan view showing a structure of a thin film transistor array substrate according to a fourth embodiment of the present invention.

FIG. 19 is a plan view showing a structure of a thin film transistor array substrate according to a fourth embodiment of the present invention. The pixel area 205 defined between the data line 204 and the gate line 202 includes a plurality of aperture areas P1 to P12 that each have a trapezoidal shape defined by the common electrode 224 and the pixel electrode 422. The horizontal part 422a of the pixel electrode 422 can have a width wider than at the center of the pixel area 205, as shown in FIG. 19. More specifically, the common electrode in each aperture area has a perpendicularly bent "L" shape while the pixel electrode has an "L" shape opposed to the common electrode in a diagonal direction and bent at an acute angle that is less than 90 degrees. More particularly, the angle between two sides of the pixel electrode 422a and 422b is less than 90 degrees and greater than 30 degrees.

Figure 20:
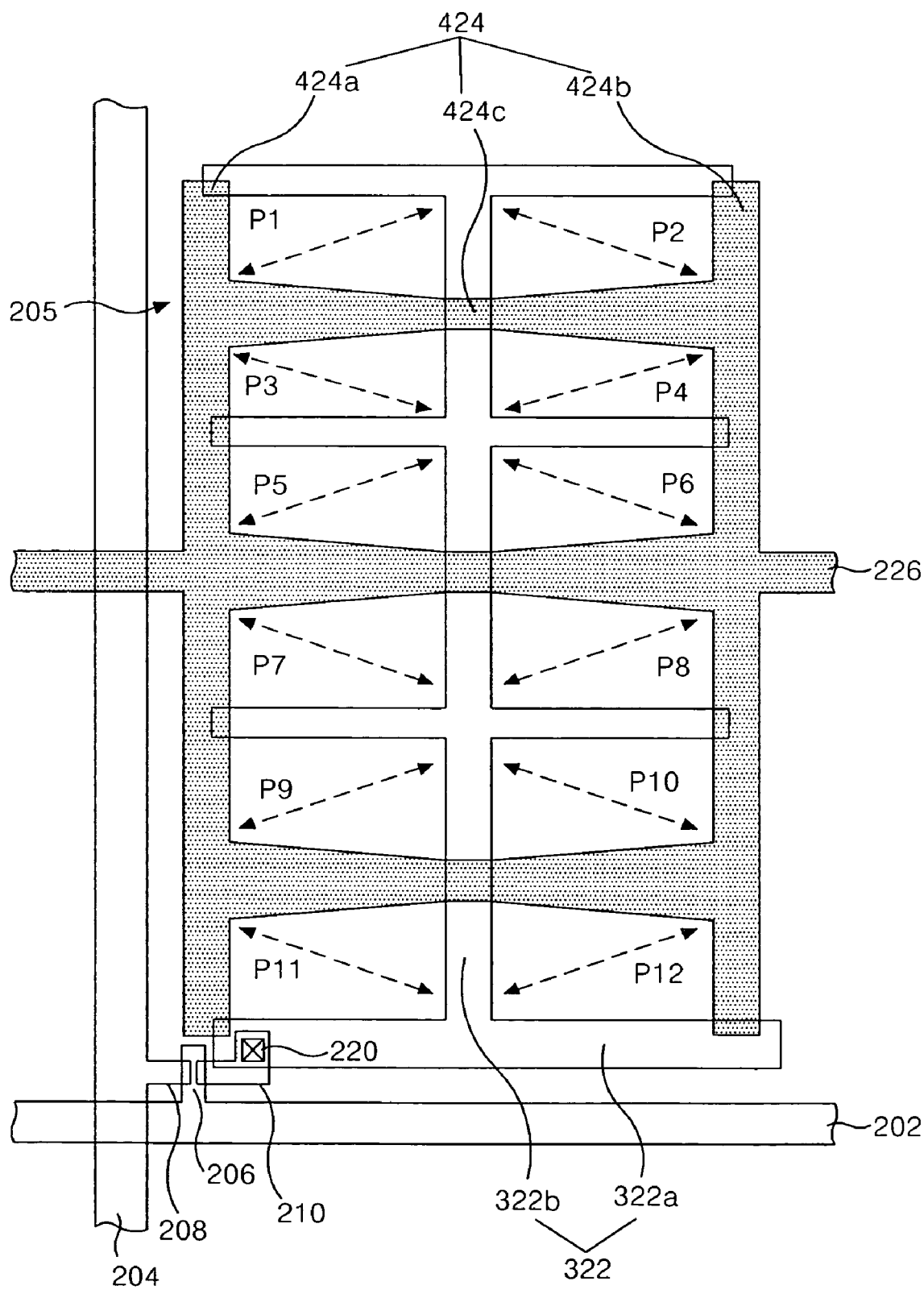
FIG. 20 is a plan view showing a structure of a thin film transistor array substrate according to a fifth embodiment of the present invention.

FIG. 20 is a plan view showing a structure of a thin film transistor array substrate according to a fifth embodiment of the present invention. The pixel area 205 defined between the data line 204 and the gate line 202 includes a plurality of aperture areas P1 to P12 that each have a trapezoidal shape defined by the common electrode 424 and the pixel electrode 322. The angle between two sides of the common electrode can be greater than 90 degrees and smaller than 150 degrees. For example, the pixel electrode in each aperture area has a perpendicularly bent "L" shape while the common electrode has an "L" shape opposed to the pixel electrode in a diagonal direction and bent at an obtuse angle that is greater than 90 degrees and smaller than 150 degrees. As shown in FIG. 20, the horizontal sides 424a or 424b of the common electrode 424 can have an inverse "L" shape bent at an obtuse angle with regard to the vertical side 424c of the common electrode 424.

Figure 21:
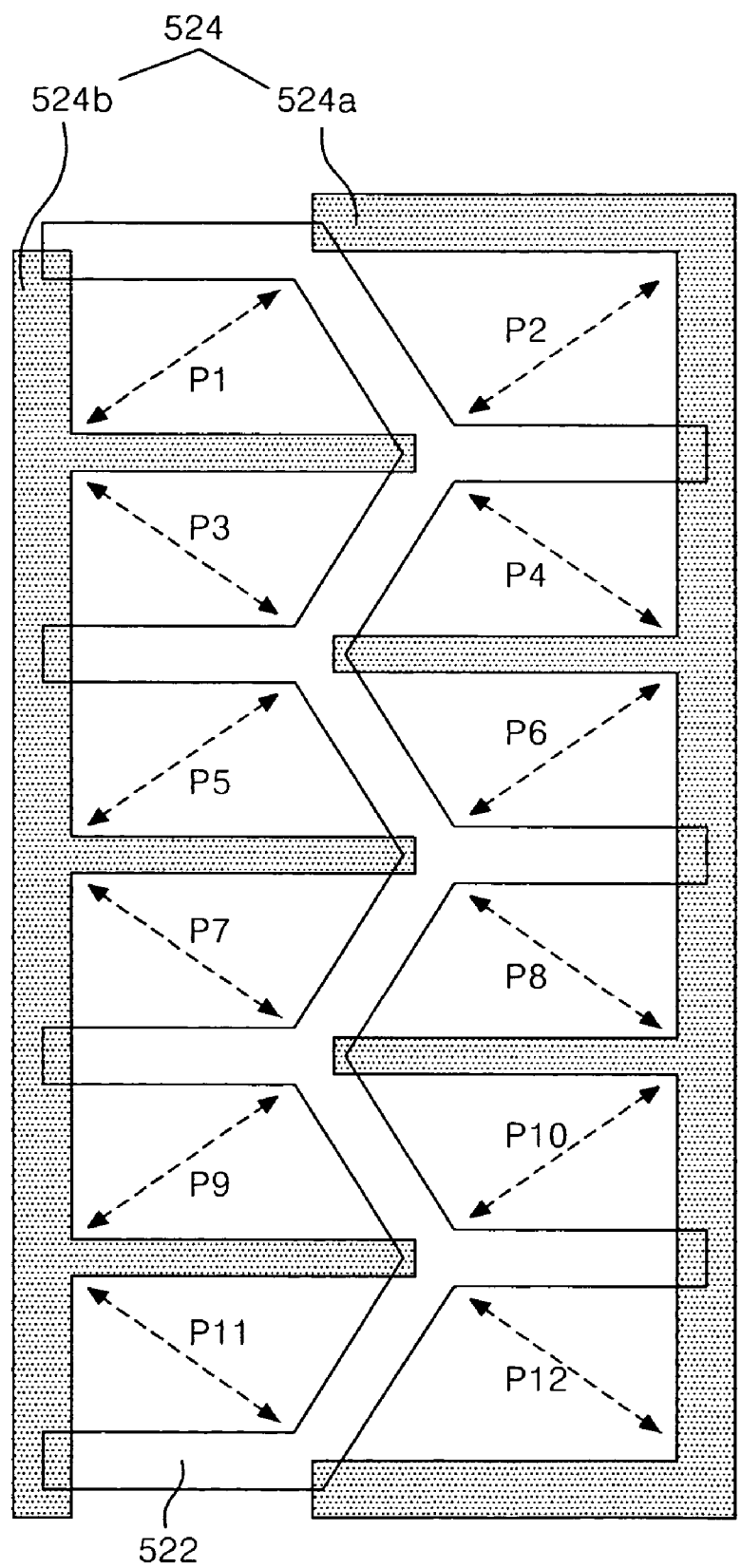
FIG. 21 is a plan view showing a structure of a thin film transistor array substrate according to a sixth embodiment of the present invention.

FIG. 21 is a plan view showing a structure of a thin film transistor array substrate according to a sixth embodiment of the present invention.

A common electrode 524 shown in FIG. 21 takes an "L" shape at each aperture area P1 to P12. A common electrode 524a positioned at the even-numbered aperture areas P2 to P12 is connected with a common electrode 524b positioned at the odd-numbered aperture areas P1 to P11. A pixel electrode 522 takes an "L" shape having one inclined side at each aperture area P1 to P12. An angle between two sides of the pixel electrode 522 is larger than 90 degrees and smaller than 150 degrees.

Meanwhile, the pixel electrode 522 and the common electrode 524 can improve an aperture ratio in comparison with the pixel electrodes and the common electrodes taking a trapezoidal shape as shown in FIG. 9, FIG. 11, FIG. 19 and FIG. 20. This is caused by a fact that, if the trapezoidal-shaped pixel electrode or common electrode is formed from an opaque metal, then it enlarges an area for shutting off a light to thereby reduce an aperture ratio in comparison with the pixel electrode 522 and the common electrode 524 shown in FIG. 21.

As described above, according to the embodiments of the present invention, the aperture area defined by the common electrode and the pixel electrode has a trapezoidal shape. When a voltage is applied to the common electrode and the pixel electrode, then the liquid crystal positioned between the common electrode and the pixel electrode is rotated in a range of 45 to 60 degrees. Accordingly, a liquid crystal area having stable maximum transmittance can be enlarged, thereby improving light transmittance. The thin film transistor array substrate according to the embodiments of the present invention can be provided by using five masks, but may be provided with less than five masks for the purpose of improving a production yield.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A thin film transistor array substrate, comprising:
a gate line and a data line on a substrate to define a pixel area;
a thin film transistor in the pixel area;
a pixel electrode connected to the thin film transistor; and
a common electrode positioned to oppose the pixel electrode and forming a plurality of columns and rows of closed aperture areas for transmitting and shutting off light by a rotation of liquid crystal positioned within said aperture areas,
wherein the pixel electrode and the common electrode are configured such that an electric field between the pixel electrode and the common electrode in a first aperture area is substantially symmetric to an electric field between the pixel electrode and the common electrode in a second aperture area, wherein the first and second aperture areas include at least one of an acute or obtuse angle, and
wherein the pixel electrode includes a plurality of horizontal parts parallel to the gate line and a vertical part connected to the plurality of horizontal parts and parallel to the data line.

2. The thin film transistor array substrate according to claim 1, wherein a first angle between two sides of one of the pixel electrode and the common electrode is greater than 90 degrees.

3. The thin film transistor array substrate according to claim 2, wherein a second angle between two sides of another one of the pixel electrode and the common electrode is greater than 90 degrees.

4. The thin film transistor array substrate according to claim 3, wherein the angle is greater than 90 degrees and less than 150 degrees.

5. The thin film transistor array substrate according to claim 1, wherein a first angle between two sides of one of the pixel electrode and the common electrode is less than 90 degrees.

6. The thin film transistor array substrate according to claim 5, wherein a second angle between two sides of another one of the pixel electrode and the common electrode is less than 90 degrees.

7. The thin film transistor array substrate according to claim 6, wherein an angle is less than 90 degrees and greater than 30 degrees.

8. The thin film transistor array substrate according to claim 1, wherein an angle between one of the horizontal parts and the vertical part is greater than 90 degrees and less than 150 degrees.

9. The thin film transistor array substrate according to claim 1, wherein an angle between the one of the horizontal parts and the vertical part is less than 90 degrees and greater than 30 degrees.

10. The thin film transistor array substrate according to claim 1, wherein the common electrode includes:
    first and second vertical parts parallel to the data line; and
    a horizontal part between the first and second vertical parts and parallel to the gate line.

11. The thin film transistor array substrate according to claim 10, wherein an angle between the horizontal part and one of the first and second vertical parts is greater than 90 degrees and less than 150 degrees.

12. The thin film transistor array substrate according to claim 10, wherein an angle between the horizontal part and one of the first and second vertical parts is less than 90 degrees and greater than 30 degrees.

13. The thin film transistor array substrate according to claim 1, wherein the maximum rotation angle of each center of the aperture areas is greater than 45 degrees.

14. A thin film transistor array substrate, comprising:
    a plurality of aperture areas having a tetragonal shape in a pixel area defined between a gate line and a data line,
    a pixel electrode and a common electrode positioned in the pixel area defining at least first and second aperture areas; and
    wherein at least one corner angle of the first and second aperture areas is different from other corner angles, wherein the pixel electrode and the common electrode are configured such that an electric field between the pixel electrode and the common electrode in the first aperture area is substantially symmetric to an electric field between the pixel electrode and the common electrode in the second aperture area, and
    wherein the pixel electrode includes a plurality of horizontal parts parallel to the gate line and a vertical part connected to the plurality of horizontal parts and parallel to the data line.

15. The thin film transistor array substrate according to claim 14, wherein an angle between two sides of one of the pixel electrode and the common electrode is either less than 90 degrees or greater than 90 degrees.

16. The thin film transistor array substrate according to claim 15, wherein the angle is greater than 90 degrees and less than 150 degrees.

17. The thin film transistor array substrate according to claim 15, wherein the angle is less than 90 degrees and greater than 30 degrees.

18. The thin film transistor array substrate according to claim 14, wherein the maximum rotation angle of at least one of the plurality of aperture areas is greater than 45 degrees.

19. A method of fabricating a thin film transistor array substrate, comprising the steps of:
    forming a gate line and a data line on a substrate to define a pixel area;
    forming a thin film transistor in the pixel area;
    forming a pixel electrode connected to the thin film transistor; and
    forming a common electrode positioned to oppose the pixel electrode to form columns and rows of closed aperture areas for transmitting and shutting off light by a rotation of liquid crystal positioned within the pixel area, wherein a first aperture area has a substantially symmetric electric field to a second aperture area, wherein the aperture areas include at least one of an acute or obtuse angle,
    wherein the step of forming the pixel electrode includes forming a plurality of horizontal parts parallel to the gate line and a vertical part connected to the plurality of horizontal parts and parallel to the data line.

20. The method according to claim 19, wherein an angle between one of the horizontal parts and the vertical part is greater than 90 degrees and less than 150 degrees.

21. The method according to claim 19, wherein the angle between one of the horizontal parts and the vertical part is less than 90 degrees and greater than 30 degrees.

22. The method according to claim 19, wherein the step of forming the common electrode includes:
    first and second vertical parts parallel to the data line; and
    a horizontal part between the first and second vertical parts and parallel to the gate line.

23. The method according to claim 22, wherein an angle between the horizontal part and one of the vertical parts is greater than 90 degrees and less than 150 degrees.

24. The method according to claim 22, wherein an angle between the horizontal part and one of the vertical parts is less than 90 degrees and greater than 30 degrees.

25. The method of claim 19, wherein the maximum rotation angle of each center of the aperture areas is greater than 45 degrees.

26. A method of fabricating a thin film transistor array substrate, comprising the steps of:
    forming a gate line and a data line on a substrate to define a pixel area;
    forming a thin film transistor in the pixel area;
    forming a pixel electrode connected to the thin film transistor; and
    forming a common electrode positioned to oppose the pixel electrode to form first and second closed aperture areas for transmitting and shutting off light by a rotation of liquid crystal positioned within the pixel area, the common electrode including first and second vertical parts parallel to the data line, the common electrode further including a horizontal part between the first and second vertical parts and parallel to the gate line, wherein an angle between the horizontal part and one of the vertical parts is less than 90 degrees and greater than 30 degrees,
    wherein the first aperture area has a substantially symmetric electric field to the second aperture area, wherein the aperture areas include at least one of an acute or obtuse angle.

* * * * *